(12) United States Patent
Swander et al.

(10) Patent No.: US 8,301,895 B2
(45) Date of Patent: Oct. 30, 2012

(54) IDENTITY BASED NETWORK POLICY ENABLEMENT

(75) Inventors: Brian Swander, Bellevue, WA (US); Daniel R. Simon, Mercer Island, WA (US); Pascal Menezes, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 398 days.

(21) Appl. No.: 12/629,059

(22) Filed: Dec. 2, 2009

(65) Prior Publication Data

US 2011/0131417 A1   Jun. 2, 2011

(51) Int. Cl.
*H04L 9/32* (2006.01)
(52) U.S. Cl. ......... 713/176; 713/153; 713/168; 709/223
(58) Field of Classification Search ................. None
See application file for complete search history.

(56) References Cited

U.S. PATENT DOCUMENTS

| | | | |
|---|---|---|---|
| 7,089,421 B2 | 8/2006 | Wheeler et al. | |
| 7,254,133 B2* | 8/2007 | Govindarajan et al. | 370/394 |
| 2001/0009025 A1* | 7/2001 | Ahonen | 713/161 |
| 2002/0156906 A1 | 10/2002 | Kadyk et al. | |
| 2003/0152081 A1 | 8/2003 | Soderberg et al. | |
| 2004/0236965 A1* | 11/2004 | Krohn | 713/201 |
| 2007/0124489 A1 | 5/2007 | Swander et al. | |
| 2009/0113517 A1 | 4/2009 | Engdahl et al. | |
| 2009/0125957 A1 | 5/2009 | Singh et al. | |

FOREIGN PATENT DOCUMENTS

EP     1978703 A1    10/2008

OTHER PUBLICATIONS

"Identity-based Policy Enforcement", retrieved at <<http://www.infosecurityproductsguide.com/technology/2007/Nevis_identity_whitepaper.pdf>>, Nevis Networks, pp. 1-13.
Forsberg, Dan, "Use Cases of Implicit Authentication and Key Establishment with Sender and Receiver ID Binding", retrieved at <<http://www.tcs.hut.fi/Studies/T-79.7001/2006AUT/seminar-papers/Forsberg-paper-final.pdf>>, Helsinki University of Technology: T-110.7290 Research Seminar on Network Security, Autumn 2006, pp. 1-7.
Lee, et al., "Understanding the Role of Identification and Authentication in NetWare 4", retrieved at <<http://support.novell.com/techcenter/articles/ana19941002.html>>, Oct. 1, 1994, pp. 11.
"International Search Report", Mailed Date: Jul. 15, 2011, Application No. PCT/US2010/055671, Filed Date: Nov. 5, 2010, pp. 8.

* cited by examiner

*Primary Examiner* — Fikremariam A Yalew

(57) ABSTRACT

Enhanced network data transmission security and individualized data transmission processing can be implemented by intermediaries in a communication path between two endpoint peers individually having the capability to identify and authenticate one or both of the endpoint peers. Communication session establishment, endpoint peer identity processing and authentication and data traffic encryption protocols are modified to allow intermediaries to track the communications between endpoint peers for a particular communication session and obtain information to authenticate the endpoint peers and identify data traffic transmitted between them. Intermediaries can use the identities of one or both of the endpoint peers to enforce identity based rules for processing data traffic between the endpoint peers for a communication session.

18 Claims, 16 Drawing Sheets

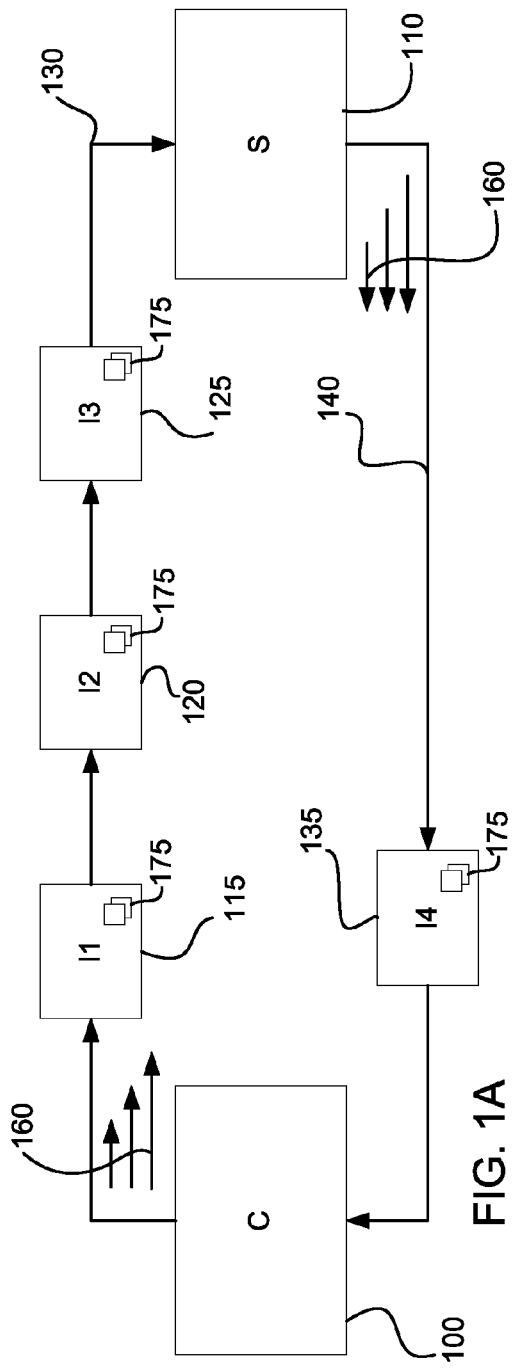
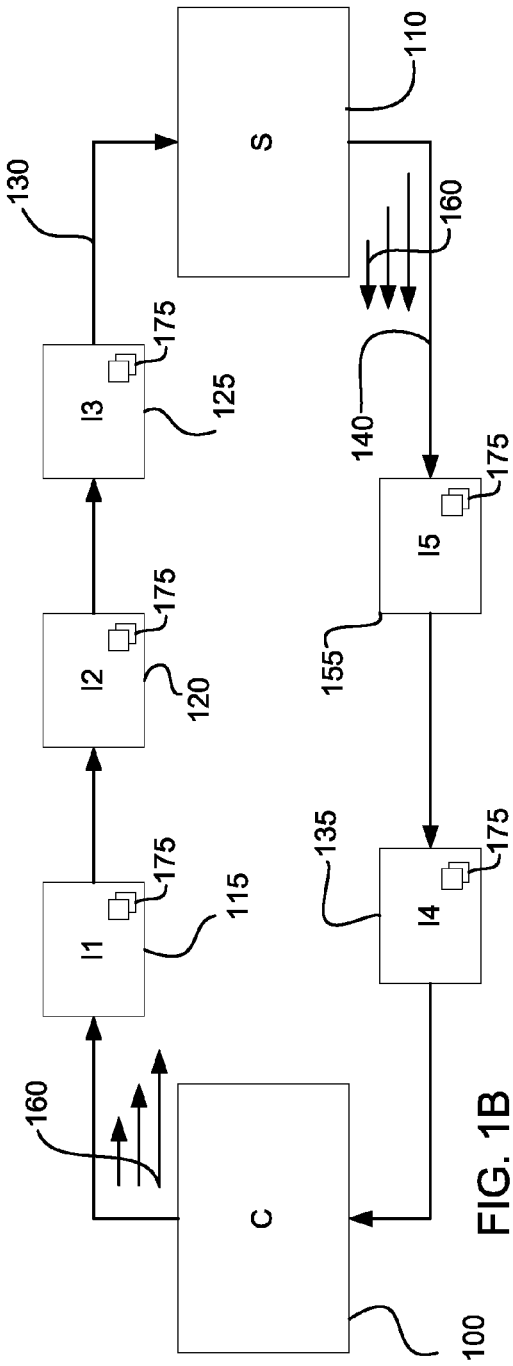

IDENTITY BASED NETWORK POLICY ENABLEMENT

BACKGROUND

Computers and computer-based devices, e.g., PDAs (personal digital assistants), external drives, etc., collectively referred to herein as computing devices, are endpoint peers in communication sessions between one or more computing devices. For example, one computing device, e.g., a client, and a second computing device, e.g., a server, are endpoint peers in myriad communication sessions initiated by the computing devices or a user, or users, of one or both of the computing devices.

The paths that the data packets in a communication session between two endpoint peers traverse often include one or more intermediaries. An intermediary is hardware and/or software that dispatches and/or passes through communication between endpoint peers. Exemplary intermediaries include, but are not limited to, switches, routers, load balancers, gate keepers, etc.

It would be desirable for intermediaries in the communication paths between endpoint peers to be capable of identifying the endpoint users. It would further be desirable for intermediaries in communication paths between endpoint peers to be able to authenticate endpoint users that are employing authentication and, potentially, encryption protocols.

Thus, it would be advantageous to functionally enable a system and processes for intermediaries in a communication path between endpoint peers to identify one or both of the endpoint peers and to authenticate one or both of the endpoint peers and/or their users. It would further be advantageous and expedient if the system and processes for endpoint peer identification and authentication were included within existing systems and processes for endpoint peer communication, authentication and/or encryption protocols so entirely new protocols need not be designed and implemented.

Intermediary ability to authenticate endpoint peers can provide additional security protection for transmitted data traffic as the intermediaries in the communication path of a communication session will have confidence that the data traffic is from/to who it is expected/intended. Intermediary ability to identify endpoint peers can support enhanced granularity of network traffic processing as it will enable intermediaries to implement and enforce identity based rules on the data traffic transmitted through them.

SUMMARY

This summary is provided to introduce a selection of concepts in a simplified form that are further described below in the Detailed Description. This summary is not intended to identify key or essential features of the claimed subject matter, nor is it intended to be used as an aid in determining the scope of the claimed subject matter.

Embodiments discussed herein include systems and methodology for enabling identity based processing of data traffic between two endpoint peers in a communication session.

In embodiments intermediaries in a communication path for a communication session between two endpoint peers modify the handshake message(s) used by the endpoint peers to establish the communication session by adding an intermediary stamp before forwarding the handshake message(s) on. In embodiments the intermediaries can thereafter use their intermediary stamp to identify messages transmitted between the endpoint peers that can be used to identify one or both of the endpoint peers. In embodiments the intermediaries can also thereafter use their intermediary stamp to identify messages transmitted between the endpoint peers that authenticate the endpoint peers and/or provide cryptographic information that will be used to encrypt the data packets subsequently transmitted between the endpoint peers. In these embodiments the intermediaries can acquire the necessary information to identify and authenticate endpoint peers and to identify data packets transmitted between endpoint peers for a particular communication session.

In embodiments the endpoint peers transmit the intermediary stamps in their handshake message(s) and in one or more of their authentication and/or encryption protocol messages. In embodiments one or both of the endpoint peers use the intermediary stamps to generate a hash signature that the intermediaries can decipher to use, along with a respective certificate, to authenticate an endpoint peer. In embodiments endpoint peer authentication provides enhanced security and certainty to identity based rule application in processing endpoint peer data traffic.

BRIEF DESCRIPTION OF THE DRAWINGS

These and other features will now be described with reference to the drawings of certain embodiments and examples which are intended to illustrate and not to limit the invention, and in which:

FIG. 1A depicts an exemplary communication session with two endpoint peers and various intermediaries.

FIG. 1B depicts the exemplary communication session of FIG. 1A with the addition of a new intermediary.

DETAILED DESCRIPTION

In the following description, for purposes of explanation, numerous specific details are set forth in order to provide a thorough understanding of embodiments described herein. It will be apparent, however, to one skilled in the art that the embodiments may be practiced without these specific details. In other instances well-known structures and devices are shown in block diagram form in order to avoid unnecessary obscuration. Any and all titles used throughout are for ease of explanation only and are not for any limiting use.

FIG. 1A depicts an exemplary internet protocol (IP) communication session between two endpoint peers, a client 100 and a server 110. In the example of FIG. 1A three intermediaries, I1 115, I2 120 and I3 125, are situated between the client 100 and server 110 in the client-to-server (C->S) communication direction 130. In embodiments an intermediary is hardware and/or software that dispatches and/or passes through communication, i.e., IP packets, between two endpoint peers. Exemplary intermediaries include, but are not limited to, switches, routers, load balancers, gate keepers, etc. In the example of FIG. 1A one intermediary, I4 135, is situated between the client 100 and server 110 in the server-to-client (S->C) communication direction 140.

In embodiments a communication session is between two endpoint peers, an initiator and a responder. In the example of FIG. 1A the client 100 is the initiator and the server 110 is the responder.

Figure 2:
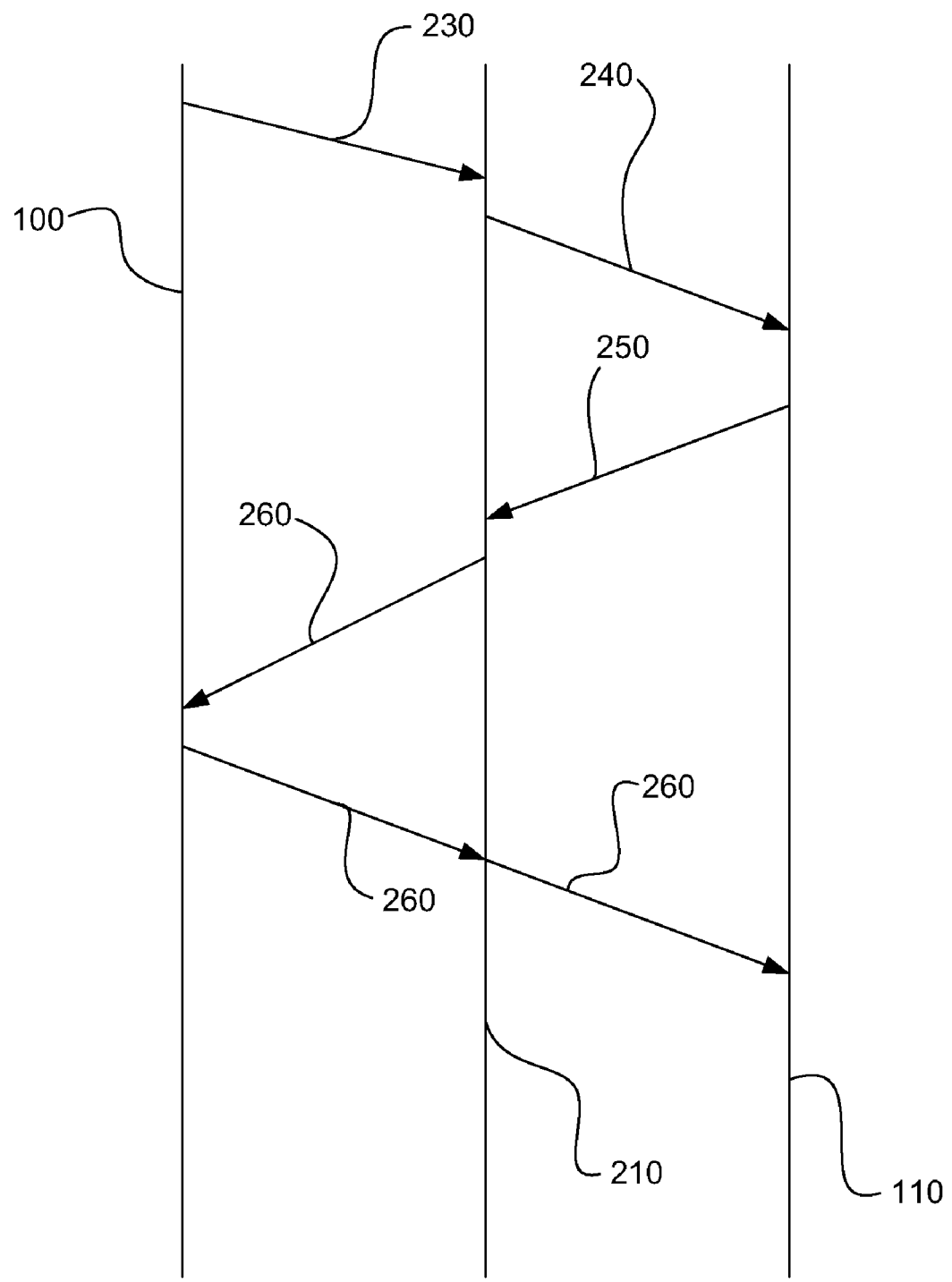
FIG. 2 illustrates an embodiment communications protocol for intermediaries to identify endpoint peers in a communication session with no authentication or encryption.

In an embodiment in which neither authentication between endpoint peers, or entities, e.g., the client 100 and server 110 of FIG. 1A, or encryption of payloads, i.e., data traffic, or data packets 160, transmitted between endpoint entities, is employed, the intermediaries can determine the identity of the initiator and/or the responder for use in enforcing identity based policies, or rules, 175 on the data packets 160 flowing through them. Referring to FIG. 2, in this embodiment the initiator 100 sends an unencrypted handshake message 230 to the responder 110, via the intermediary(ies) 210 in the communication path between the initiator 100 and responder 110 to establish a communication channel, or session, between the initiator 100 and the responder 110. Using the example of FIG. 1A, the client 100 sends a handshake message 230 to the server 110 via the I1 115, I2 120 and I3 125 intermediaries.

Figure 3A:
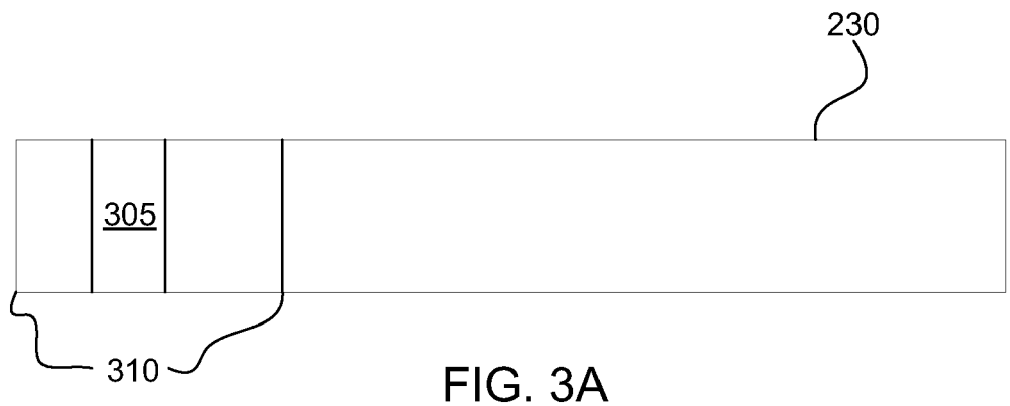
FIGS. 3A, 3B, 3C and 3D depict embodiment communications protocol messages for endpoint peers that can be amended by intermediaries.

Referring to FIG. 3A an embodiment handshake message 230 has a header 310. In an aspect of this embodiment handshake message 230 the header 310 includes an initiator, e.g., client 100, cookie 305. In an embodiment the initiator cookie 305 consists of data, e.g., one or more numbers or number pairs, which can be used to designate the initiator 100 for the communication session attempting to be instantiated. In an embodiment the initiator cookie 305 characterizes the initiator 100 as an endpoint peer associated with data traffic for a particular communication session.

In another embodiment the handshake message 230 includes data sufficient to designate related traffic between the same two endpoints and which can be used to distinguish the initiator 100.

In an embodiment, as the handshake message 230 is transmitted from the initiator 100 to intermediary I1 115, intermediary I2 120, and intermediary I3 125, and finally to the endpoint responder 110 in the C->S communication direction 130 each intermediary I1 115, I2 120 and I3 125 can view the handshake message 230 and obtain the initiator cookie 305. In this manner each intermediary 210 in the C->S communication direction 130 can identify the initiator 100 beyond the initiator's IP (internet protocol) address. In an embodiment each intermediary 210 in the C->S communication direction 130 that does view the handshake message 230 and obtains the initiator cookie 305 stores the initiator cookie 305, and/or information derived there from, for use in the current communication session between the initiator 100 and responder 110.

In an embodiment, as the handshake message 230 is received by a first intermediary 210, e.g., I1 115, I1 115 appends, or otherwise inserts or includes therein, an intermediary stamp before passing the now modified handshake message 240 on to the next entity, i.e., intermediary 210 or endpoint peer, in the C->S communication direction 130. In an embodiment, as each additional intermediary 210 in the C->S communication direction 130 receives the modified handshake message 240 each intermediary 210 appends an intermediary stamp to the modified handshake message 240 before passing the modified handshake message 240 on to the next entity in the C->S communication direction 130.

Figure 3B:
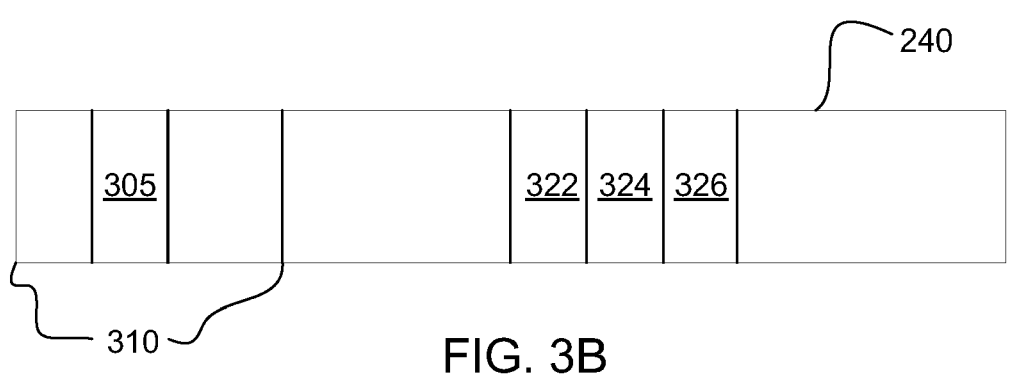

In this embodiment, and referring to the modified handshake message 240 of FIG. 3B, when I1 115 receives the handshake message 230 it appends an intermediary I1 stamp 322 to the handshake message 230 and passes the modified handshake message 240 onto the next entity, I2 120, in the C->S communication direction 130. In this embodiment and example, when I2 120 receives the modified handshake message 240 it appends an intermediary I2 stamp 324 and passes the modified handshake message 240 onto the next entity, I3 125, in the C->S communication direction 130. In this embodiment and example, when I3 125 receives the modified handshake message 240 it appends an intermediary I3 stamp 326 and passes the modified handshake message 240 onto the endpoint responder 110.

Figure 4:
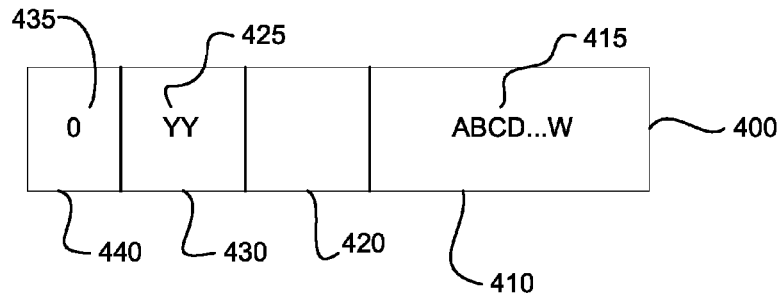
FIG. 4 illustrates an embodiment intermediary stamp.

Referring to FIG. 4, an embodiment intermediary stamp 400 added by an intermediary 210 has a nonce field 410 which contains a unique nonce, e.g., nonce 415, for the intermediary 210. In an embodiment a nonce is a random or pseudo-random number. In alternative embodiments a nonce can be other identifiers, random, pseudo-random or specific. In an embodiment the nonces stored in the nonce field 410 are of variable length.

In an embodiment intermediary stamp 400 has a reserved field 420 for future utilization. In an embodiment intermediary stamp 400 has a nonce size field 430 which indicates the size, e.g., size 425, of the nonce, e.g., nonce 415, in the nonce field 410. In an embodiment intermediary stamp 400 has a type field 440. In an embodiment the type field 440 contains an indication of the intermediary stamp type.

Figure 3C:
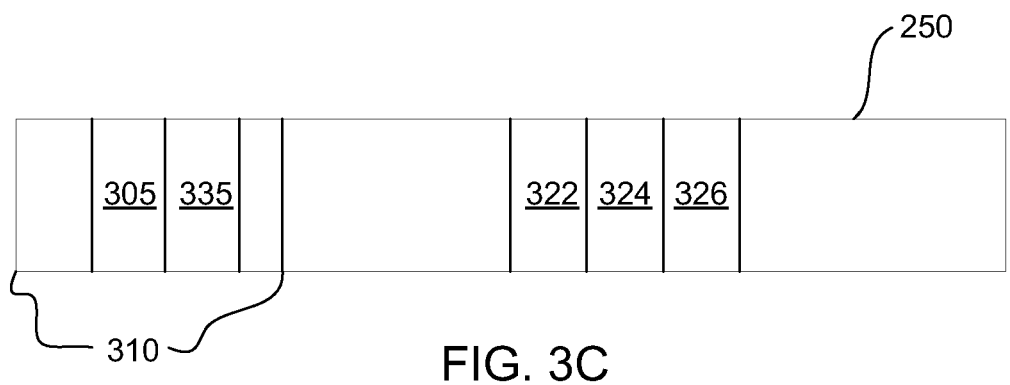

Referring to FIG. 2, in an embodiment when the responder 110 receives the modified handshake message 240 it includes a responder cookie 335 therein and transmits the modified handshake message 250 back to the initiator, e.g., client 100, in the S->C communication direction 140. Referring to FIG. 3C, in an embodiment the responder 110 adds the responder cookie 335 to the header 310 of the modified handshake message 250. In an embodiment the responder cookie 335 consists of data, e.g., one or more numbers or number pairs, which can be used to designate the responder 110 for the communication session attempting to be instantiated. In an embodiment the responder cookie 335 characterizes the responder 110 as an endpoint peer associated with data traffic for a particular communication session.

In another embodiment when the responder 110 receives the modified handshake message 240 it includes therein data which can be used to distinguish the responder 110 and transmits the modified handshake message 250 back to the initiator 100 in the S->C communication direction 140.

In an alternative embodiment, when the responder 110 receives the modified handshake message 240 it formats a new handshake message 250. In this alternative embodiment the new handshake message 250 has similar content to the embodiment handshake message 250 of FIG. 3C in that it has a header which includes the initiator cookie 305 and the responder cookie 335, or other data that can be used to distinguish the initiator 100 and the responder 110, and it includes the intermediary stamps 322, 324 and 326 from intermediaries I1 115, I2 120 and I3 125. In this alternative embodiment the new handshake message 250 can contain different header contents and/or values than the modified handshake message 250 previously discussed with reference to FIG. 3C. In this alternative embodiment the new handshake message 250 can also, or alternatively, contain different payload contents and/or values than the modified handshake message 250 discussed with reference to FIG. 3C.

In an embodiment and the example of FIG. 1A, as the handshake message 250 is transmitted from the server 110 to intermediary I4 135 and then to the endpoint client 100 in the S->C communication direction 140 I4 135 can view the handshake message 250 and obtain the initiator, client, cookie 305 and the responder, server, cookie 335. In this manner each intermediary 210 in the S->C communication direction 140 can identify the initiator 100 beyond the initiator's IP address. In this manner each intermediary 210 in the S->C communication direction 140 can also identify the responder 110 beyond the responder's IP address. In an embodiment each intermediary 210 in the S->C communication direction 140 that does obtain the initiator cookie 305 stores the initiator cookie 305 and/or information derived there from for use in the current communication session between the initiator, client, 100 and the responder, server, 110. In an embodiment each intermediary 210 in the S->C communication direction 140 that does obtain the responder cookie 335 stores the responder cookie 335 and/or information derived there from for use in the current communication session between the initiator 100 and responder 110.

Figure 3D:
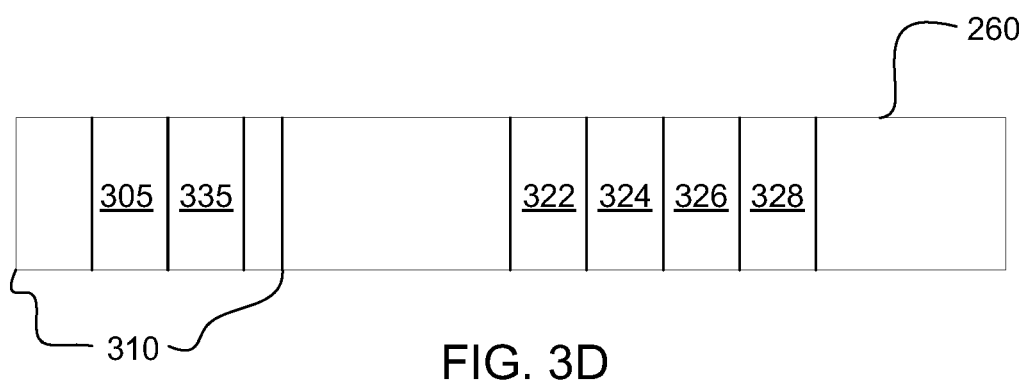

In an embodiment, when the handshake message 250 is received by the intermediary I4 135 in the S->C communication direction 140 I4 135 appends, or otherwise inserts or includes therewith, an intermediary stamp 328 before passing the modified handshake message 260 onto the endpoint client 100. An embodiment modified handshake message 260, as shown in FIG. 3D, has an I4 135 intermediary stamp 328. In this embodiment and the example of FIG. 1A, when the client 100 receives the modified handshake message 260 from I4 135 the client 100 can ascertain that there are four intermediaries between it and the server 110. In this embodiment and example the client 100 can also use the intermediary stamps 322, 324, 326 and 328 to identify, at least nominally, the four current intermediaries, i.e., I1 115, I2 120, I3 125 and I4 135, between the client 100 and server 110. Intermediary information can be used by the client 100 for a variety of purposes, including but not limited to, controlling the C->S communication direction 130 path for desired communication performance.

Referring again to FIG. 2, in an embodiment when the initiator, client, 100 receives the modified handshake message 260 the client 100 echoes the modified handshake message 260 back to the responder, server, 110 in the C->S communication direction 130.

In an embodiment, as the modified handshake message 260 is passed from the client 100 to intermediaries I1 115, I2 120, and I3 125 and then to the endpoint server 110 in the C->S communication direction 130 each intermediary I1 115, I2 120 and I3 125 can view the modified handshake message 260 and obtain the responder, e.g., server, 110 cookie 335. In this manner each intermediary 210 in the C->S communication direction 130 can identify the responder 110 beyond the responder's IP address. In an embodiment each intermediary 210 in the C->S communication direction 130 that does view the modified handshake message 260 and obtains the responder cookie 335 stores the responder cookie 335 and/or information derived there from for use in the current communication session between the initiator 100 and the responder 110.

In an embodiment each intermediary I1 115, I2 120 and I3 125 in the C->S communication direction 130 can determine that the modified handshake message 260 is for the same communication session as the original handshake message 230, or modified handshake message 240, by verifying that the intermediary's respective stamp, e.g., 322, 324 or 326, is included in the modified handshake message 260.

In an embodiment and the example of FIG. 1A when the server 110 receives the modified handshake message 260 containing intermediary stamps 322, 324, 326 and 328 for each of the intermediaries 210 between the client 100 and server 110, the server 110 can ascertain that there are four intermediaries 210 between it and the client 100. In this embodiment and example the server 110 also can use the intermediary stamps 322, 324, 326 and 328 to identify, at least nominally, the four current intermediaries, i.e., I1 115, I2 120, I3 125 and I4 135, between the client 100 and server 110. Intermediary information can be used by the server 110 for a variety of purposes, including but not limited to, controlling the S->C communication direction 140 path for desired communication performance.

In alternative embodiments not every intermediary 210 may have a use for identifying the endpoint peers in a communication session. For example in some alternative embodiments one or more intermediaries 210, e.g., I2 120, will treat each data packet 160 passing through it in the same manner, and thus has no need to distinguish the endpoint peers involved in any particular communication session. In these alternative embodiments the one or more intermediaries 210 that are unconcerned with endpoint peer identity need not view the handshake message 230 or the modified handshake messages 240, 250 or 260, nor obtain the initiator cookie 305 or the responder cookie 335.

In still other alternative embodiments one or more intermediaries 210 may only be concerned with identifying one endpoint peer, e.g., client 100, in a communication session. For example, one or more intermediaries 210 may be preconfigured to know the identity of one of the endpoint peers, e.g., server 110, as this endpoint peer is always the same for the intermediary 210. As another example, one or more intermediaries 210 may be configured to enforce identity based rules 175 for data packets 160 based on the identity of only one of the endpoint peers in a communication session. In an aspect of these alternative embodiments the intermediary 210 will not store the cookie, or information derived there from, for the endpoint peer that the intermediary 210 is unconcerned with.

Figure 5:
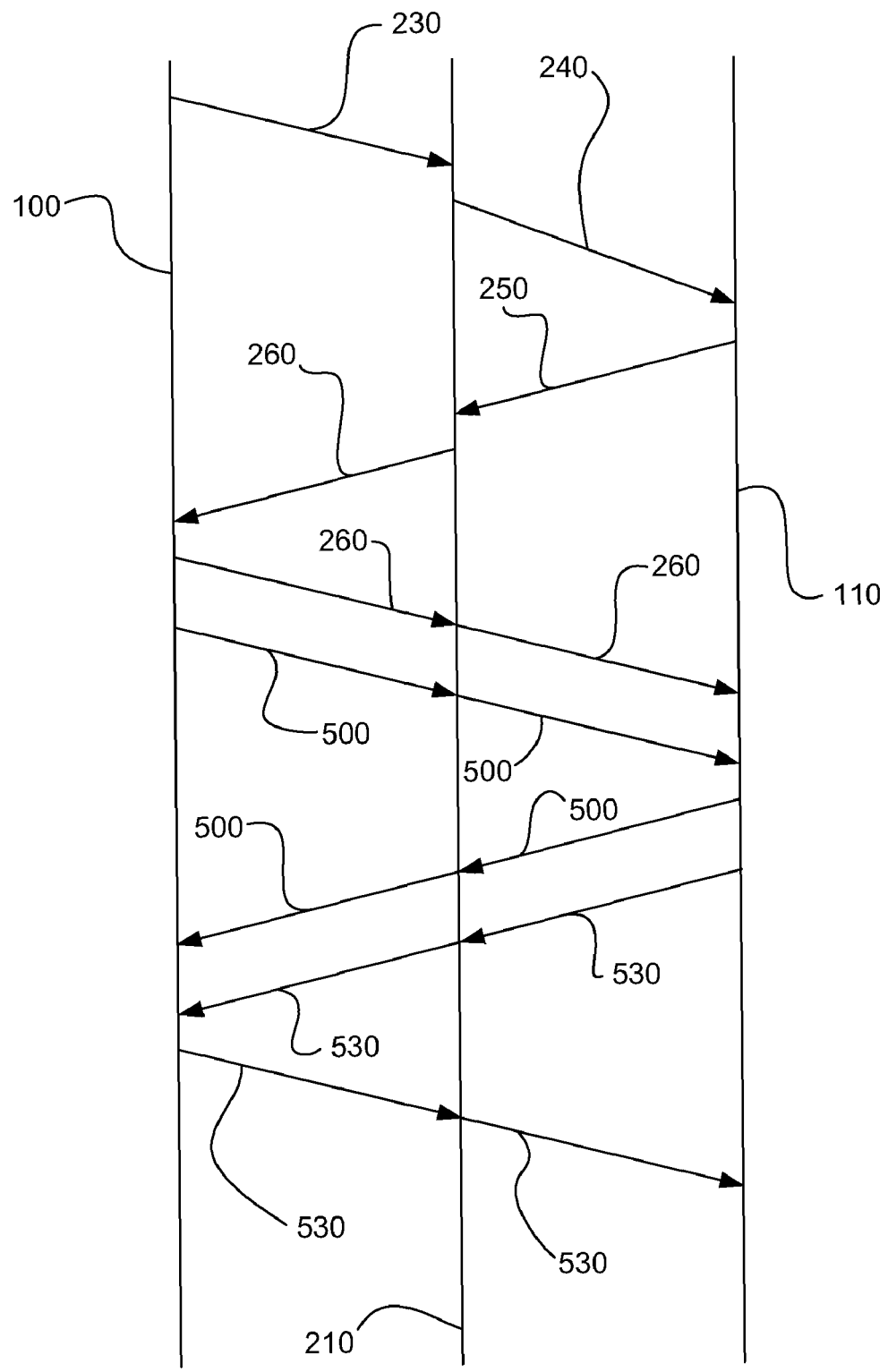
FIG. 5 illustrates an embodiment communications protocol for intermediaries to authenticate and identify endpoint peers in a communication session with authentication and encryption.

In an embodiment in which an authentication protocol between endpoint peers, e.g., the client 100 and server 110 of FIG. 1A, is employed, intermediaries 210 can identify and authenticate one or both endpoint peers for use in enforcing identity based policies, or rules, 175 on the data traffic 160 transmitted between them. Referring to FIG. 5, in this embodiment the initiator, e.g., client, 100 transmits a handshake message 230 to the responder, e.g., server, 110, via the intermediary(ies) 210 in the communication path between initiator 100 and responder 110. Using the example of FIG. 1A, the client 100 sends a handshake message 230 to the server 110 via the I1 115, I2 120 and I3 125 intermediaries.

In an embodiment, as shown in FIG. 3A, the handshake message 230 includes a header 310 which includes an initiator cookie 305. In another embodiment the handshake message 230 includes data sufficient to designate related traffic between the same two endpoint peers and which can be used to distinguish the initiator 100.

In an embodiment the header 310 of the handshake message 230 is in clear text, i.e., it is unencrypted.

In an embodiment, as the handshake message 230 is received by a first intermediary 210, e.g., I1 115, I1 115 appends, or otherwise inserts or includes therein, an intermediary stamp before passing the now-modified handshake message 240 on to the next entity, i.e., intermediary 210 or endpoint peer, in the C->S communication direction 130. In an embodiment, as each additional intermediary 210 in the C->S communication direction 130 receives the modified handshake message 240 each intermediary 210 appends an intermediary stamp to the modified handshake message 240 before passing the modified handshake message 240 on to the next entity in the C->S communication direction 130.

In this embodiment, and referring to the modified handshake message 240 of FIG. 3B, when I1 115 receives the handshake message 230 it appends an intermediary I1 stamp 322 to the handshake message 230 and passes the modified handshake message 240 onto the next entity, I2 120, in the C->S communication direction 130. In this embodiment and example, when I2 120 receives the modified handshake message 240 it appends an intermediary I2 stamp 324 and passes the modified handshake message 240 onto the next entity, I3 125. In this embodiment and example, when I3 125 receives the modified handshake message 240 it appends an intermediary I3 stamp 326 and passes the modified handshake message 240 onto the endpoint responder 110.

Referring to FIG. 4, an embodiment intermediary stamp 400 added by an intermediary 210 has a nonce field 410 which contains a unique nonce, e.g., nonce 415, for the intermediary 210. In an embodiment a nonce is a random or pseudo-random number. In alternative embodiments a nonce can be other identifiers, random, pseudo-random or specific. In an embodiment the nonces stored in the nonce field 410 are of variable length.

In an embodiment intermediary stamp 400 has a reserved field 420 for future utilization. In an embodiment intermediary stamp 400 has a nonce size field 430 which indicates the size, e.g., size 425, of the nonce. In an embodiment intermediary stamp 400 has a type field 440. In an embodiment the type field 440 contains an indication of the intermediary stamp type. In an aspect of this embodiment the type field 440 for an intermediary stamp appended to a modified handshake message 240 contains an identity that indicates the intermediary stamp 400 is an authentication request stamp. In an embodiment a stamp type of zero (0) 435 indicates the intermediary stamp 400 is an authentication request stamp.

Referring again to FIG. 5, in an embodiment when the responder 110 receives the modified handshake message 240 it adds a responder cookie 335 thereto and transmits the modified handshake message 250 back to the initiator, e.g., client 100, in the S->C communication direction 140. Referring to FIG. 3C, in an embodiment the responder 110 adds the responder cookie 335 to the header 310 of the modified handshake message 250.

In another embodiment when the responder 110 receives the modified handshake message 240 it includes therein data which can be used to distinguish the responder 110 and transmits the modified handshake message 250 back to the initiator 100 in the S->C communication direction 140. In an embodiment the responder 110 adds data that can be used to distinguish it to the header 310 of the modified handshake message 250.

In an embodiment the header 310 of the modified handshake message 250 is clear text, i.e., it is unencrypted.

In an alternative embodiment, when the responder 110 receives the modified handshake message 240 it formats a new handshake message 250. In this alternative embodiment the new handshake message 250 has similar content to the embodiment handshake message 250 of FIG. 3C in that it has a header which includes the initiator cookie 305 and the responder cookie 335, or, alternatively, data that can be used to distinguish the initiator 100 and the responder 110, and it includes the intermediary stamps 322, 324 and 326 from intermediaries I1 115, I2 120 and I3 125. In this alternative embodiment the new handshake message 250 can contain different header contents and/or values than the modified handshake message 250 previously discussed with reference to FIG. 3C. In this alternative embodiment the new handshake message 250 can also, or alternatively, contain different payload contents and/or values than the modified handshake message 250 discussed with reference to FIG. 3C.

In an embodiment, when an intermediary 210 in the S->C communication direction 140 receives a handshake message 250 transmitted from the responder 110 each intermediary 210 appends, or otherwise inserts or includes therewith, an intermediary stamp before passing the modified handshake message 260 onto the next entity, intermediary 210 or endpoint peer, in the S->C communication direction 140.

Thus in an embodiment, and with reference to FIGS. 1A and 5, when the handshake message 250 is received by intermediary I4 135 in the S->C communication direction 140 I4 135 appends an intermediary stamp 328 to the handshake message 250 before passing the modified handshake message 260 onto the endpoint client 100. An embodiment modified handshake message 260, as shown in FIG. 3D, has an I4 135 intermediary stamp 328. In this embodiment and the example of FIG. 1A, when the client 100 receives the modified handshake message 260 from I4 135 the client 100 can ascertain that there are four intermediaries 210 between it and the server 110. In this embodiment and example the client 100 can use the intermediary stamps 322, 324, 326 and 328 to identify, at least nominally, the four current intermediaries 210, i.e., I1 115, I2 120, I3 125 and I4 135, between the client 100 and server 110.

In an embodiment when the initiator, client, 100 receives the modified handshake message 260 the client 100 echoes the modified handshake message 260 back to the responder, server, 110 in the C->S communication direction 130.

In an embodiment each intermediary I1 115, I2 120 and I3 125 in the C->S communication direction 130 can determine that the modified handshake message 260 is for the same communication session as the original handshake message 230, or modified handshake message 240, by verifying that the intermediary's respective stamp, e.g., 322, 324 or 326, is included in the modified handshake message 260.

In an embodiment and the example of FIG. 1A when the server 110 receives the modified handshake message 260 containing intermediary stamps 322, 324, 326 and 328 for each of the intermediaries 210 between the client 100 and server 110, the server 110 can ascertain that there are four intermediaries 210 between it and the client 100. In this embodiment and example the server 110 also can use the intermediary stamps 322, 324, 326 and 328 to identify, at least nominally, the four current intermediaries, i.e., I1 115, I2 120, I3 125 and I4 135, between the client 100 and server 110.

In an embodiment the initiator, e.g., client, 100 and/or the responder, e.g., server, 110 authenticate themselves to the intermediaries 210. In an embodiment the initiator 100 and responder 110 use verifier tx messages, each also referred to herein as a verify tx, to authenticate themselves. In an embodiment a verify tx includes a signature. In an embodiment a verify tx includes a certificate.

In an embodiment the initiator 100 in a peer-to-peer communication session transmits its verifier tx message for authentication purposes first. In an embodiment in which data packet transmissions between endpoint peers are to be encrypted the responder 110 dictates the key(s) to encrypt these transmissions.

In the example of FIG. 1A the client 100 is the initiator as the client 100 initiates the communication process with the server 110 and the server 110 is the responder. In the example of FIG. 1A the responder, server 110, dictates the key(s) to encrypt the data packets transmitted between client 100 and server 110.

Figure 6A:
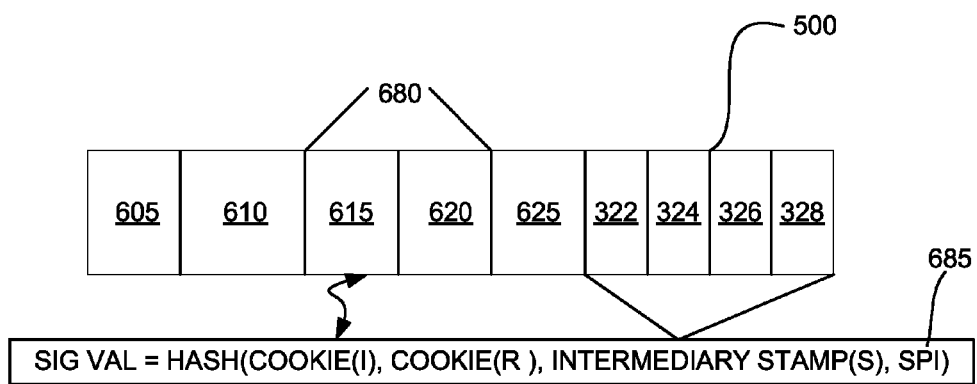
FIGS. 6A and 6B depict embodiment communications protocol messages for endpoint peers to authenticate themselves to intermediaries.

Using the example of FIG. 1A and referring to FIG. 5 again, in an embodiment the initiator, client, 100 formats and transmits an initiator verify tx 500 to the responder, server, 110. Referring to FIG. 6A an embodiment initiator verify tx 500 contains an iverify packet 680. An embodiment iverify packet 680 contains an initiator signature 615. An embodiment iverify packet 680 contains an initiator certificate 620.

In an embodiment the initiator signature 615 has been signed with a private key associated with the initiator certificate 620 that the intermediaries 210 can recognize and trust. In an embodiment, when the intermediaries 210 receive the initiator verify tx 500 they can extract and use the initiator signature 615 and initiator certificate 620 from the iverify packet 680 to confirm that the initiator signature 615 correlates with the initiator certificate 620 and, consequently, authenticate that the initiator 100 is who it claims to be.

In another embodiment, when the intermediaries 210 receive the initiator verify tx 500 they can extract and use the initiator signature 615 from the iverify packet 680 and along with either an initiator certificate that they have stored, or initiator certificate information they have stored, confirm that the initiator signature 615 correlates with the initiator certificate, or initiator certificate information, thereby authenticating the initiator 100.

In an embodiment, in authenticating the initiator 100 the intermediaries 210 also identify the initiator 100 beyond the information the intermediary 210 has, e.g., IP address and initiator cookie 305, that designates the initiator 100 within the context of the data flow for the communication session. In embodiments the initiator certificate 620, or the stored initiator certificate or certificate information, collectively referred to herein as the initiator certificate 620, can identify the user, e.g., John Smith, using, or otherwise controlling, the initiator 100 device. In embodiments the initiator certificate 620 can also, or alternatively, identify the initiator 100 device, e.g., description of the device and/or unique device id. In embodiments the initiator certificate 620 can also, or alternatively, identify properties of the user, e.g., user occupation, user employer, user's employment group, etc. and/or properties of the initiator 100 device, e.g., personal computer, hand-held device, computing device maker/model number, etc. In embodiments the initiator certificate 620 can also, or alternatively, identify the locality of the user and/or initiator 100 device, e.g., United States, Washington, Redmond, ABC Corporation Bldg. 8, etc. In embodiments the initiator certificate 620 can also, or alternatively, identify other user and/or initiator 100 device information and/or any combination thereof.

In an embodiment the initiator signature 615 is a signed signature value. In an aspect of this embodiment the signature value is the result of a hash algorithm 660. An embodiment hash algorithm 660 uses as input the initiator cookie 305, the responder cookie 335, the intermediary stamps, e.g., intermediary stamps 322, 324, 326 and 328, and the initiator security parameters index (SPI) 685. In an embodiment the initiator SPI 685 identifies the security parameters for the C->S communication direction 130, and in combination with the initiator IP address, is used to identify the implemented security association (SA). In an embodiment an SA is a logical group of security parameters used for providing a secure data connection. In an embodiment the hash algorithm 660 is previously negotiated between the initiator 100 and responder 110 via one or more communications between the initiator 100 and responder 110.

In an embodiment the use of the intermediary stamps to generate a signature value for the initiator signature 615 supports per-intermediary input to the endpoint peer generated signature value. In this embodiment the initiator 100 can provide proof of initiator identity to all intermediaries 210 with a single initiator signature 615.

In alternative embodiments the initiator signature 615 and/or signature value is the result of other algorithms with the same or other inputs.

In an embodiment the iverify packet 680 contents are in clear text, i.e., the iverify packet is unencrypted.

In an embodiment the initiator verify tx 500 contains a header 605. In an embodiment the initiator verify tx 500 contains one or more control packets 610. In an aspect of this embodiment the control packet(s) 610 is (are) employed by the initiator 100 and responder 110 for establishing a secure data channel for transmissions between them. In an aspect of this embodiment the control packet(s) 610 is (are) also, or alternatively, used by the initiator 100 and responder 110 to authenticate themselves to each other. In an aspect of this embodiment the control packet(s) 610 is (are) also, or alternatively, used to establish the cryptography to be used for transmissions between the initiator 100 and responder 110.

In an embodiment the initiator verify tx 500 contains an initiator negotiation info (ineginfo) packet 625. In an embodiment the ineginfo packet 625 contains the id (identification) for the hash algorithm 660. In an embodiment the ineginfo packet 625 also contains the initiator SPI 685. As previously noted, in an embodiment the initiator SPI 685 identifies the security parameters for the C->S communication direction 130, and in combination with the initiator IP address, identifies the implemented security association (SA).

In an embodiment the contents of the ineginfo packet 625 are in clear text.

In an embodiment the initiator verify tx 500 contains the intermediary stamp for each intermediary 210 in the communication path between the initiator 100 and responder 110. In an embodiment the intermediary stamps in the initiator verify tx 500 are in clear text.

In an embodiment, as the initiator verify tx 500 is transmitted from the client 100 to intermediaries I1 115, I2 120 and I3 125, and then to the endpoint server 110 in the C->S communication direction 130 each intermediary I1 115, I2 120 and I3 125 can identify its intermediary stamp and determine that the initiator verify tx 500 is part of the communication session between the initiator 100 and responder 110 that the intermediary 210 is now tracking.

In an embodiment the intermediaries 210 in the C->S communication direction 130 can use the initiator signature 615 and initiator certificate 620 to attempt to identify and authenticate the client 100. In an embodiment the intermediaries 210 have access to the hash algorithm 660's id and the initiator SPI 685 as they are unencrypted in the ineginfo packet 625. In an embodiment the intermediaries 210 have access to all the intermediary stamps, e.g., stamps 322, 324, 326 and 328. In an embodiment the intermediaries 210 have access to the initiator cookie 305 and the responder cookie 335 and/or information derived there from. Thus, in an embodiment the intermediaries 210 have the necessary information for decoding the initiator signature 615 and confirming that the initiator signature 615 properly correlates to the initiator certificate 620.

In an embodiment intermediary I1 115 receives the initiator verify tx 500 and can use the initiator signature 615 and initiator certificate 620 to attempt to identify and authenticate the client 100. If the initiator signature 615 is valid, i.e., the initiator signature 615 correlates to the initiator certificate 620, intermediary I1 115 has authenticated the initiator 100.

In an embodiment intermediary I2 120, upon receiving the initiator verify tx 500, can use the initiator signature 615 and initiator certificate 620 to attempt to identify and authenticate the client 100. If the initiator signature 615 is valid intermediary I2 120 has authenticated the initiator 100.

In an embodiment intermediary I3 125, upon receiving the initiator verify tx 500, can use the initiator signature 615 and initiator certificate 620 to attempt to identify and authenticate the client 100. If the initiator signature 615 is valid intermediary I3 125 has authenticated the initiator 100.

Referring again to FIG. 5, in an embodiment, upon the endpoint peer responder, e.g., server, 110 receiving the initiator verify tx 500 the responder 110 echoes the initiator verify tx 500 back to the initiator 100 in the S->C communication direction 140. In this manner the intermediaries 210 in the S->C communication direction 140 can authenticate the initiator 100.

In an embodiment and the example of FIGS. 1A and 5, as the initiator verify tx 500 is transmitted in the S->C communication direction 140 intermediary I4 135 can identify its intermediary stamp and determine that the initiator verify tx 500 is part of the communication session between the initiator 100 and responder 110 that I4 135 is now tracking.

In an embodiment the intermediaries 210 in the S->C communication direction 140 can use the initiator signature 615 and initiator certificate 620 to attempt to identify and authenticate the client 100. In an embodiment the intermediaries 210 have access to the hash algorithm 660's id and the initiator SPI 685 as they are unencrypted in the ineginfo packet 625. In an embodiment the intermediaries 210 have access to all the intermediary stamps as they are unencrypted in the initiator verify tx 500. In an embodiment the intermediaries 210 have access to the initiator cookie 305 and the responder cookie 335 and/or information derived there from. Thus, in an embodiment the intermediaries 210 have the necessary information for decoding the initiator signature 615 and confirming it correlates to the initiator certificate 620.

In an embodiment each intermediary 210 that authenticates the initiator 100 stores the initiator cookie 305 and/or information derived there from for use in the current communication session between the initiator 100 and the responder 110. In an embodiment each intermediary 210 that authenticates the initiator 100 stores the initiator IP address for use in the current communication session between the initiator 100 and the responder 110. In an embodiment each intermediary 210 that authenticates the initiator 100 stores the initiator certificate 620 and/or information derived there from for use in the current communication session between the initiator 100 and the responder 110. In an embodiment each intermediary 210 that authenticates the initiator 100 stores the initiator SPI 685 for use in the current communication session between the initiator 100 and the responder 110. In an embodiment each intermediary 210 that authenticates the initiator 100 stores the hash id from the ineginfo packet 625 which identifies the hash algorithm 660 used for communications between the initiator 100 and responder 110 in the C→S communication direction 130.

Using the example of FIG. 1A and referring to FIG. 5 again, in an embodiment the responder, e.g., server 110, formats and transmits a responder verify tx 530 to the initiator, e.g., client 100. In an aspect of this embodiment the responder 110 transmits the responder verify tx 530 to the initiator 100 after echoing the initiator verify tx 500 back to the initiator 100.

Figure 6B:
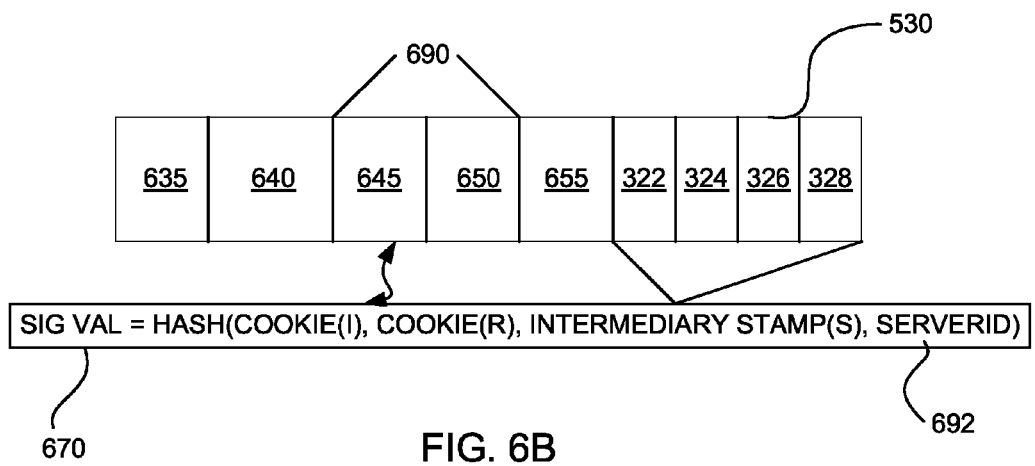

Referring to FIG. 6B an embodiment responder verify tx 530 contains an rverify packet 690. In an embodiment the rverify packet 690 contains a responder signature 645. In an embodiment the rverify packet 690 contains a responder certificate 650.

In an embodiment the responder signature 645 is signed with a private key associated with the responder certificate 650 that the intermediaries 210 can recognize and trust. In an embodiment, when the intermediaries 210 receive the responder verify tx 530 they can extract and use the responder signature 645 and responder certificate 650 from the rverify packet 690 to confirm that the responder signature 645 correlates with what is expected in the responder certificate 650 and, consequently, authenticate that the responder 110 is who it claims to be.

In another embodiment, when the intermediaries 210 receive the responder verify tx 530 they can extract and use the responder signature 645 from the rverify packet 690 and along with either a responder certificate that they have stored, or responder certificate information they have stored, confirm that the responder signature 645 correlates with the responder certificate, or responder certificate information, thereby authenticating the responder 110.

In an embodiment, in authenticating the responder 110 the intermediaries 210 also identify the responder 110 beyond the information the intermediary 210 has, e.g., IP address and responder cookie 335, that designates the responder 110 within the context of the data flow for the communication session. In embodiments the responder certificate 650, or the stored responder certificate or certificate information, collectively referred to herein as the responder certificate 650, can identify the user, e.g., John Smith, using, or otherwise controlling, the responder 110 device. In embodiments the responder certificate 650 can also, or alternatively, identify the responder 110 device, e.g., description of the device and/or unique device id. In embodiments the responder certificate 650 can also, or alternatively, identify properties of the user, e.g., user occupation, user employer, user's employment group, etc. and/or properties of the responder 110 device, e.g., personal computer, hand-held device, computing device maker/model number, etc. In embodiments the responder certificate 650 can also, or alternatively, identify the locality of the user and/or responder 110 device, e.g., United States, Washington, Redmond, ABC Corporation Bldg. 8, etc. In embodiments the responder certificate 650 can also, or alternatively, identify other user and/or responder 110 device information and/or any combination thereof.

In an embodiment the responder signature 645 is a signed signature value. In an aspect of this embodiment the signature value is the result of a hash algorithm 670. An embodiment hash algorithm 670 uses as input the initiator cookie 305, the responder cookie 335, the intermediary stamps, e.g., intermediary stamps 322, 324, 326 and 328, and the responder, e.g., server, id (serverid) 692. In an aspect of this embodiment the serverid 692 is a unique identifier for the responder server 110 within the server's administrative domain. In an aspect of this embodiment the serverid 692 is an arbitrary identity value that is administratively set or formulated. In an aspect of this embodiment the serverid 692 is sixty-four (64) bits in length.

In an alternative aspect of this embodiment the serverid 692 is the responder 110's IP address.

In an embodiment the serverid 692, in combination with the responder IP address, identifies the implemented security association (SA).

An alternative embodiment hash algorithm 670 uses as input the initiator cookie 305, the responder cookie 335, the intermediary stamps and the responder security parameters index (SPI). In an embodiment the responder SPI identifies the security parameters for the S->C communication direction 140, and in combination with the responder IP address, identifies the implemented security association (SA).

In an embodiment the hash algorithm 670 is previously negotiated between the initiator 100 and responder 110 via one or more communications between the initiator 100 and responder 110.

In an embodiment the use of the intermediary stamps to generate a signature value for the responder signature 645 supports per-intermediary input to the endpoint peer generated signature value. In this embodiment the responder 110 can provide proof of responder identity to all intermediaries 210 with a single responder signature 645.

In alternative embodiments the responder signature 645 and/or signature value is the result of other algorithms with the same or other inputs.

In an embodiment the rverify packet 690 contents are in clear text, i.e., they are unencrypted.

In an embodiment the responder verify tx 530 contains a header 635. In an embodiment the responder verify tx 530 contains one or more control packets 640. In an aspect of this embodiment the control packet(s) 640 is (are) employed by the initiator 100 and responder 110 for establishing a secure data channel for transmissions between them. In an aspect of this embodiment the control packet(s) 640 is (are) also, or alternatively, used by the initiator 100 and responder 110 to authenticate themselves to each other. In an aspect of this embodiment the control packet(s) 640 is (are) also, or alternatively, used to establish the cryptography to be used for transmissions between the initiator 100 and responder 110.

In an embodiment the responder verify tx 530 contains a responder negotiation info (rneginfo) packet 655. In an embodiment the rneginfo packet 655 contains the id (identification) for the hash algorithm 670. In an embodiment the rneginfo packet 655 contains the serverid 692. In an alternative embodiment the rneginfo packet 655 contains the responder SPI. As previously noted, in an embodiment the serverid 692, or responder SPI, in combination with the responder IP address, is used to identify the implemented security association (SA).

In an alternative embodiment the responder hash algorithm 670 can use either the serverid 692 or responder SPI. In an aspect of this alternative embodiment the rneginfo packet 655 contains a field for the serverid 692 value and a field for the responder SPI 592 value, wherein one field contains the correct value and the other field is zero (0). In this manner in this alternative embodiment the intermediaries 210 can tell if the hash algorithm 670 uses the serverid 692 or responder SPI because only one of the corresponding field values in the reneginfo packet 655 will be non-zero.

In an embodiment the contents of the rneginfo packet 655 are in clear text.

In an embodiment the responder verify tx 530 contains the intermediary stamp for each intermediary 210 between the initiator 100 and responder 110. In an embodiment the intermediary stamps in the responder verify tx 530 are in clear text.

In an embodiment and the examples of FIGS. 1A and 5, as the responder verify tx 530 is transmitted from the server 110 to intermediary I4 135, and then to the endpoint client 100 in the S->C communication direction 140 I4 135 can identify its intermediary stamp and determine that the responder verify tx 530 is part of the communication between the responder 110 and initiator 100 that the intermediary 210 is now tracking.

In an embodiment the intermediaries 210 in the S->C communication direction 140 can use the responder signature 645 and responder certificate 650 to attempt to identify and authenticate the server 110. In an embodiment the intermediaries 210 have access to the hash algorithm 670's id and the serverid 692 as they are unencrypted in the rneginfo packet 655. In an embodiment the intermediaries 210 have access to all the intermediary stamps. In an embodiment the intermediaries 210 have access to the initiator cookie 305 and the responder cookie 335 and/or information derived there from. Thus, in an embodiment the intermediaries 210 have the necessary information for decoding the responder signature 645 and confirming it correlates to the responder certificate 650.

In an embodiment intermediary I4 135 can review the responder verify tx 530 and use the responder signature 645 and responder certificate 650 to attempt to identify and authenticate the server 110. If the responder signature 645 is valid, i.e., the responder signature 645 correlates with the responder certificate 650, intermediary I4 135 has authenticated the responder 110.

Referring again to FIG. 5, in an embodiment, upon the endpoint peer initiator, e.g., client, 100 receiving the responder verify tx 530 the initiator 100 echoes the responder verify tx 530 back to the responder 110 in the C->S communication direction 130. In this manner the intermediaries 210 in the C->S communication direction 130 can identify and authenticate the responder 110.

In an embodiment, as the responder verify tx 530 is transmitted from the client 100 to intermediaries 210 and then to the endpoint server 110 in the C->S communication direction 130 intermediaries I1 115, I2 120 and I3 125 can each identify its intermediary stamp and determine that the responder verify tx 530 is part of the communication session between the initiator 100 and the responder 110 that the intermediary 210 is now tracking.

In an embodiment the intermediaries 210 in the C->S communication direction 130 can use the responder signature 645 and responder certificate 650 to attempt to identify and authenticate the server 110. In an embodiment the intermediaries 210 have access to the hash algorithm 670's id and the serverid 692 as they are unencrypted in the rneginfo packet 655. In an embodiment the intermediaries 210 have access to all the intermediary stamps as they are unencrypted in the responder verify tx 530. In an embodiment the intermediaries 210 have access to the initiator cookie 305 and the responder cookie 335 and/or information derived there from. Thus, in an embodiment the intermediaries 210 have the necessary information for decoding the responder signature 645 and confirming that it correlates to the responder certificate 650.

In an embodiment each intermediary 210 that authenticates the responder 110 stores the responder cookie 335 and/or information derived there from for use in the current communication session between the initiator 100 and the responder 110. In an embodiment each intermediary 210 that authenticates the responder 110 stores the responder IP address for use in the current communication session between the initiator 100 and the responder 110. In an embodiment each intermediary 210 that authenticates the responder 110 stores the responder certificate 650 and/or information derived there from for use in the current communication session between the initiator 100 and the responder 110. In an embodiment each intermediary 210 that authenticates the responder 110 stores the serverid 692, or alternatively, the responder SPI, for use in the current communication session between the initiator 100 and the responder 110. In an embodiment each intermediary 210 that authenticates the responder 110 stores the hash id from the rneginfo packet 655 which identifies the hash algorithm 670 used for communications between the initiator 100 and responder 110 in the S->C communication direction 140.

In an embodiment, when the server 110 echoes the initiator verify tx 500 back to the client 100 and the client 100 receives it, the client 100 can assume that the intermediaries 210 have all received the initiator verify tx 500 and could use it to identify and authenticate the client 100. In an embodiment the client 100 users a timer for receiving the echoed initiator verify tx 500 back from the server 110. In an embodiment, if the client timer expires the client retransmits the initiator verify tx 500 to the server 110. In this embodiment the server 110 echoes any initiator verify tx 500 back to the client 100. In an embodiment the client 100 will retry for a successful initiator verify tx 500 sent to and from the server 110 one time. In alternative embodiments the client 100 retries for a successful initiator verify tx 500 sent to and from the server 110 other numbers of times, e.g., two times, five times, etc. In yet another alternative embodiment, upon the client timer expiring, the client will not retry for a successful initiator verify tx 500 sent to and from the server 110.

In an embodiment, when the client 100 echoes the responder verify tx 530 back to the server 110 and the server 110 receives it, the server 110 can assume that the intermediaries 210 have all received the responder verify tx 530 and could use it to identify and authenticate the server 110. In an embodiment the server 110 users a timer for receiving the echoed responder verify tx 530 back from the client 100. In an embodiment, if the server timer expires the server retransmits the responder verify tx 530 to the client 100. In this embodiment the client 100 echoes any responder verify tx 530 back to the server 110. In an embodiment the server 110 will retry for a successful responder verify tx 530 sent to and from the client 100 one time. In alternative embodiments the server 110 retries for a successful responder verify tx 530 sent to and from the client 100 other numbers of times, e.g., two times, five times, etc. In yet another alternative embodiment, upon the server timer expiring the server will not retry for a successful responder verify tx 530 sent to and from the client 100.

In an embodiment once the initiator verify tx 500 and the responder verify tx 530 are received and successfully processed by the intermediaries 210 the intermediaries 210 have the necessary information to enforce identity based rules 175 on subsequent data packets 160 transmitted between the initiator 100 and responder 110 for the current communication session. In an embodiment an intermediary 210 receives data packets 160 transmitted between the initiator 100 and responder 110 and uses the initiator SPI or responder serverid, or alternatively, responder SPI, in the data packets 160 to identify the data packets 160 for the particular initiator/responder communication session and apply any established identity based rules 175 to the data packets 160 accordingly. In an embodiment where the initiator SPI or responder serverid, or alternatively, responder SPI, is integrity protected, the intermediaries 210 have stored information capable of determining the integrity hash to identify the included initiator SPI or responder serverid, or alternatively, responder SPI, allowing the intermediaries 210 to thereafter apply any established identity based rules 175 to the data packets 160 accordingly.

In an embodiment the intermediaries 210 can verify the integrity of the data packets 160 transmitted between two endpoint peers. In an embodiment the intermediaries 210 can use their ability to verify data packets 160 between two endpoint peers in a communication session to mitigate damage caused by substitution attacks by identifying that the initiator and/or responder SPIs, or the responder serverid, and/or the initiator and/or responder IP addresses for encrypted data packets 160 have been tampered with, or otherwise altered.

In another embodiment an intermediary 210 can detect that a data packet 160 containing altered information was sent by an attacker by using the data it obtained from the handshake/authentication messages to access the relevant encryption keys for the communication session in order to look within the data packet 160 and verify its authenticity.

In an embodiment the intermediaries 210 have stored information for distinguishing between two or more simultaneous communication sessions between the same endpoint peers, and thus, the same endpoint IP addresses. For example, user data packet 160 traffic, e.g., a user accessing email, a user accessing the internet, etc., can occur simultaneously with system data packet 160 traffic, i.e., non-user initiated communication(s), sent by the hardware of one or both of the endpoint peers. In this example and embodiment the user initiated communication session will have an initiator SPI/responder serverid, or alternatively, responder SPI, combination that is different than the initiator SPI/responder serverid, or alternatively, responder SPI, combination for the system initiated communication session.

As another example, there can simultaneously be two or more user data packet traffic communication sessions between a client 100 and server 110, e.g., a user accessing their email while simultaneously engaging in a conference session with another user. In this example and embodiment each user data packet traffic communication session will have a unique initiator SPI/responder serverid, or alternatively, responder SPI, combination associated therewith. As still another example, two different users can simultaneously be logged on to the same client 100 communicating with the same server 110. In this example and embodiment each user initiated communication will be uniquely identified by an exclusive initiator SPI/responder serverid, or, alternatively, responder SPI, combination.

In all of these examples and embodiment an intermediary 210 receiving data packets 160 transmitted between the initiator 100 and responder 110 uses the IP addresses in the data packets 160 along with the initiator SPI or responder serverid, or alternatively, responder SPI, and its stored information to associate a data packet 160 with a specific initiator/responder communication session. In these examples and embodiment, if the data packet 160 information is correct the intermediary 210 applies any identity based rules 175 to the data packet 160 accordingly.

In an embodiment in which the data packets 160 transmitted between two endpoint peers in a communication session are encrypted at the initialization of the communication session the endpoint peers, e.g., client 100 and server 110, do not have any shared secrets. In an embodiment both endpoint peers connect and authenticate to the network. In an embodiment, as part of this connection and authentication protocol authorization tokens and security policies are provided to the client 100 and server 110. In an embodiment the security policies describe what security is required and how the security policy should be applied to subsequent data communications between the endpoint peers.

In an embodiment the IPsec (Internet Protocol Security) protocol for securing IP communications by authentication and encrypting each IP packet of a data stream between an initiator 100 and a responder 110 is the authenticated internet protocol, or a protocol equivalent to, similar to, or based thereon. In an embodiment the IPsec protocol has a main mode (mm) in which an mm security association (SA) is established between endpoint peers to encrypt additional authentication and cryptographic keying protocol traffic. In an embodiment IPsec protocol mm the initiator device and/or user is authenticated with the desired termination point of the security communication channel. In an embodiment IPsec protocol mm the terminating, responder 110, endpoint authenticates itself with the initiator 100.

In an embodiment the IPsec protocol used by the initiator 100 and responder 110 has a quick mode (qm) in which the security associations (SA) for securing the communication session data packets are negotiated and established. In an embodiment a negotiated qm SA has a lifetime after which a qm SA rekey, also referred to herein as a rekeying event, is required.

In an embodiment an initiator verify tx 500 and a responder verify tx 530 are transmitted for each qm SA rekey. In an aspect of this embodiment the responder 110 has no need to and does not send a rverify packet 690 in a responder verify tx 530 transmitted for a qm SA rekey.

In an embodiment intermediaries 210 inspect qm SA rekey communications flowing through them. In an embodiment, upon identifying a new qm the intermediaries 210 store the information contained in the respective initiator verify tx 500 and responder verify tx 530, as previously discussed, for use in identifying subsequent data packets 160 for the communication session between the endpoint peers and applying identity based rules 175 thereto. In an aspect of this embodiment in which the responder 110 does not send a rverify packet 690 in the responder verify tx 530 transmitted for a qm SA rekey the intermediaries 210 use the responder serverid 692 previously included in the first responder verify tx 530 between the endpoint peers for the communication session.

In an alternative embodiment not every intermediary 210 may have a use for the identity of the endpoint peers in a communication session. For example in an alternative embodiment one or more intermediaries 210, e.g., I2 120, will treat each communication passing through it in the same manner, and thus has no need to know the identity of the endpoint peers. In this alternative embodiment the one or more intermediaries 210 that are unconcerned with endpoint peer identity need not view the handshake message 230, the modified handshake messages 240, 250 or 260, the initiator verify tx 500 or the responder verify tx 530, and can treat these messages as pass-through messages. In an aspect of this alternative embodiment the one or more intermediaries 210 that are unconcerned with endpoint peer identity will not include their intermediary stamp in any handshake message 240, 250 or 260, and their intermediary stamp will not be included in the initiator verify tx 500, the responder verify tx 530, nor will it be used in the hash algorithm 660 or the hash algorithm 670.

In a second alternative embodiment one or more intermediaries 210 may only be concerned with the identity of one endpoint peer, e.g., client 100, in a communication session. For example, one or more intermediaries 210 may be preconfigured to know the identity of one of the endpoint peers, e.g., server 110, as this endpoint peer remains the same for the intermediary 210. As another example, one or more intermediaries 210 may be configured to apply identity based rules 175 for data packet 160 traffic based on the identity of only one of the endpoint peers in a communication session. In an aspect of this second alternative embodiment the intermediary 210 need only store the information necessary to identify data packets 160 transmitted between the endpoint peers for a particular communication session and apply identity based rules 175 thereto based on the identity of one endpoint peer.

In an alternative embodiment organizations that are occupied with identity exposure in the endpoint peers' transmissions of their certificates, which can effectively broadcast the endpoint peers' identities, can employ certificates whose identity is a GUID (globally unique identifier) or a SID (security identifier). In an embodiment a GUID is an identifier used to provide a reference number which is essentially unique. In an embodiment a SID is a unique name, i.e., alphanumeric character string, which is assigned during the log on process and is used to identify a subject such as a user or group of users in a network.

In an embodiment organizations have modes where authentication tokens can behave like smartcards. In an aspect of such an embodiment the initiator certificate 620 and/or the responder certificate 650 can be a processing authentication token complete with claims.

In an embodiment a new intermediary 210 may become involved in the communication session between two endpoint peers. For example, a new intermediary 210 may come online after the endpoint peers have already authenticated themselves to each other and the initial online intermediaries involved in the communication session and the security associations (SAs) have already been negotiated and established. As another example, a route change can reroute data packet 160 traffic in a communication session so that it now passes through a new intermediary 210. Referring to FIG. 1B, an example of a new intermediary 210 becoming involved in an established communication session depicts new intermediary I5 155 having come online in the S->C communication direction 140 between the client 100 and server 110 of FIG. 1A. In these examples and embodiment any new intermediary 210, e.g., intermediary I5 155, must discern the identities of one or both of the endpoint peers, e.g., client 100 and server 110, in order to be capable of imposing identity based rules 175 on the data packets 160 sent between them.

In an embodiment a new intermediary 210 to an existing communication session requests the endpoint peers rerun the identity and authentication protocols. In an embodiment a new intermediary 210, e.g., intermediary I5 155, sets a flag in any data packet 160 transmitted between the endpoint peers indicating that the intermediary 210 is newly involved and the identity and authentication protocols are requested to be rerun. In an alternative embodiment a new intermediary 210 appends a new packet to a data packet 160 transmitted between the endpoint peers that indicates the intermediary 210 requests the identity and authentication protocols be rerun. In yet another alternative embodiment a new intermediary 210 generates a stand-alone rerun transmission that it transmits to the endpoint peer in the communication direction the intermediary 210 is included in to request the identity and authentication protocols be rerun. In other alternative embodiments other formats can be used to signal an endpoint peer that an intermediary 210 requests the identity and authentication protocols be rerun.

In an embodiment the endpoint peer that first receives an intermediary 210 request to rerun the identity and authentication protocols becomes the new initiator and the protocols of FIG. 2 or FIG. 5 are rerun. In an embodiment, if the first endpoint peer to receive an intermediary 210 request to rerun the identity and authentication protocols was not the initiator during the initial identity and authentication protocol communications, this endpoint peer, i.e., responder 110, will forward a notification to the original initiator 100 to initiate the identity and authentication protocols of FIG. 2 or FIG. 5. In aspects of this embodiment the responder 110 can forward the flag indicating a rerun request in the next data packet 160 sent to the initiator 100, can append the packet indicating a rerun request to the next transmitted data packet 160, can forward the stand-alone rerun transmission to the initiator 100, etc.

In an embodiment one endpoint peer in a communication session may be configured to authenticate itself to intermediaries 210 while the other endpoint peer is not so configured. In the embodiment and example of FIG. 5 the endpoint peer that is not configured to authenticate itself to the intermediaries 210 will not include a verify packet, e.g., iverify packet 680 or rverify packet 690, or a negotiation info packet, e.g., ineginfo 635 or rneginfo 655, in its respective verify tx, e.g., initiator verify tx 500 or responder verify tx 530. In this embodiment and example the intermediaries 210 in the communication path between the initiator 100 and responder 110 will only be able to apply identity based rules 175 that correlate to the identity of the known endpoint peer, i.e., the endpoint peer configured to and capable of authenticating itself to the intermediaries 210.

Figure 7A:
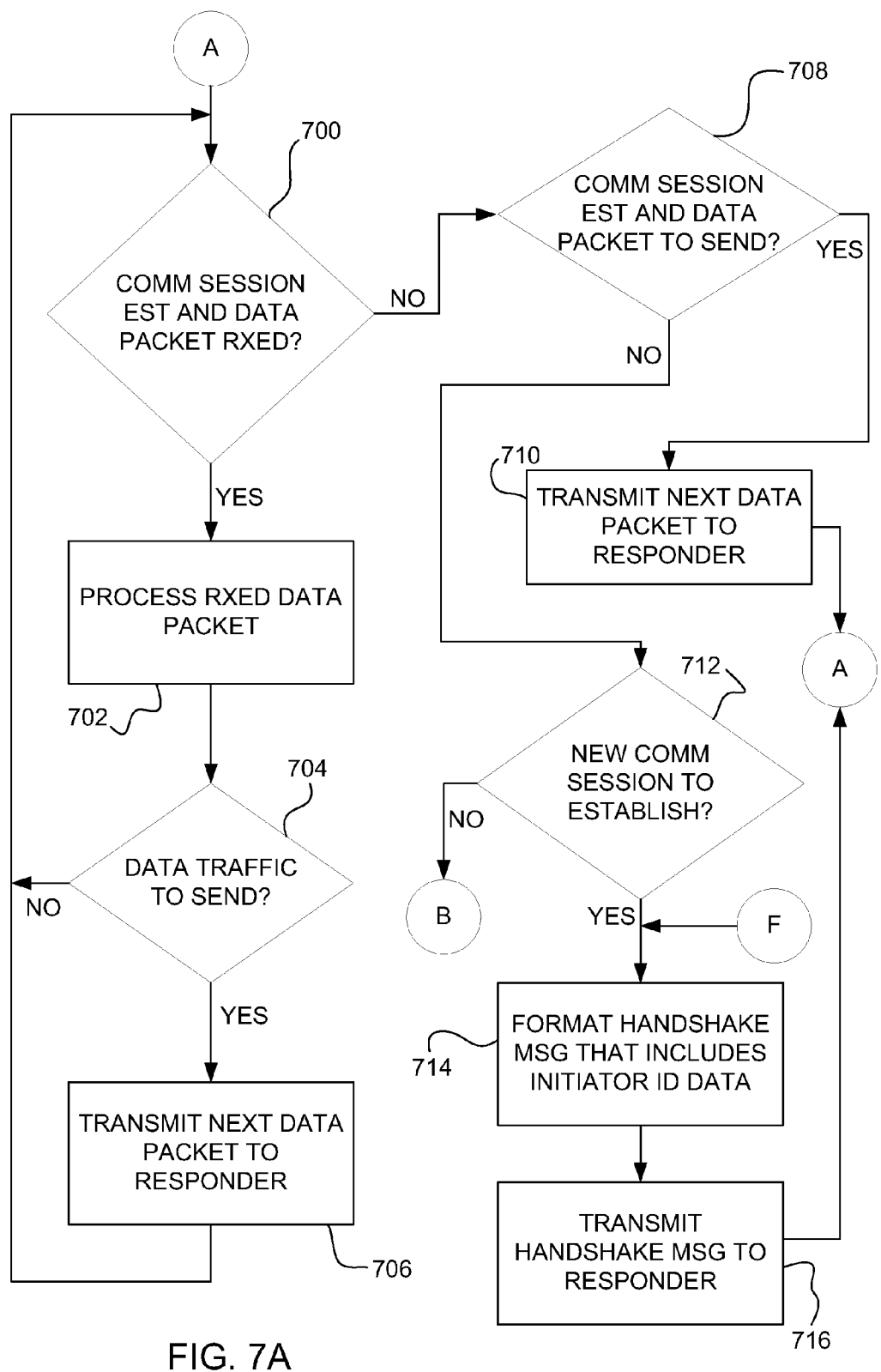
FIGS. 7A-7C illustrate an embodiment logic flow for an initiator endpoint peer to identify and authenticate itself to one or more intermediaries in a communication session.
Figure 7B:
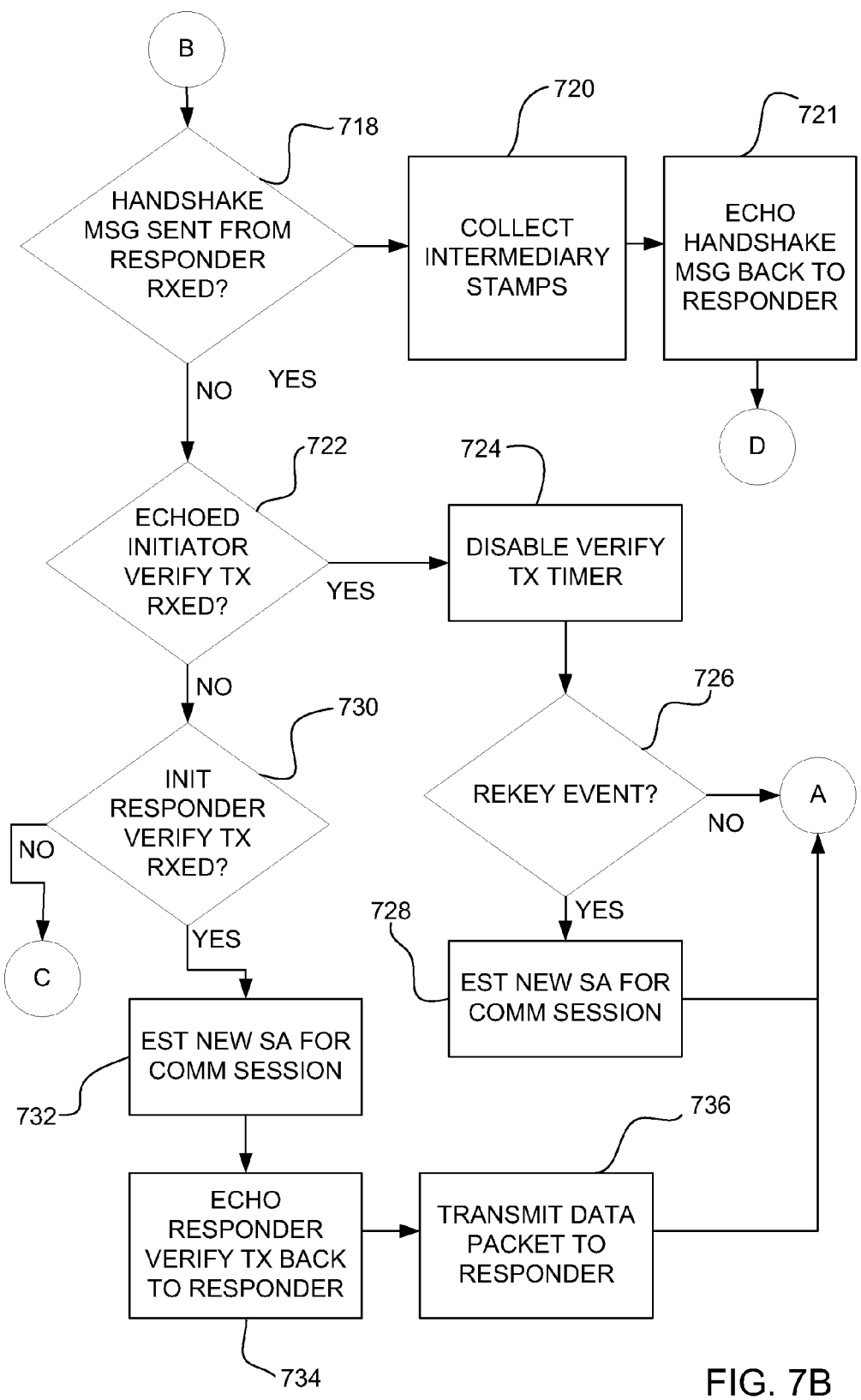
Figure 7C:
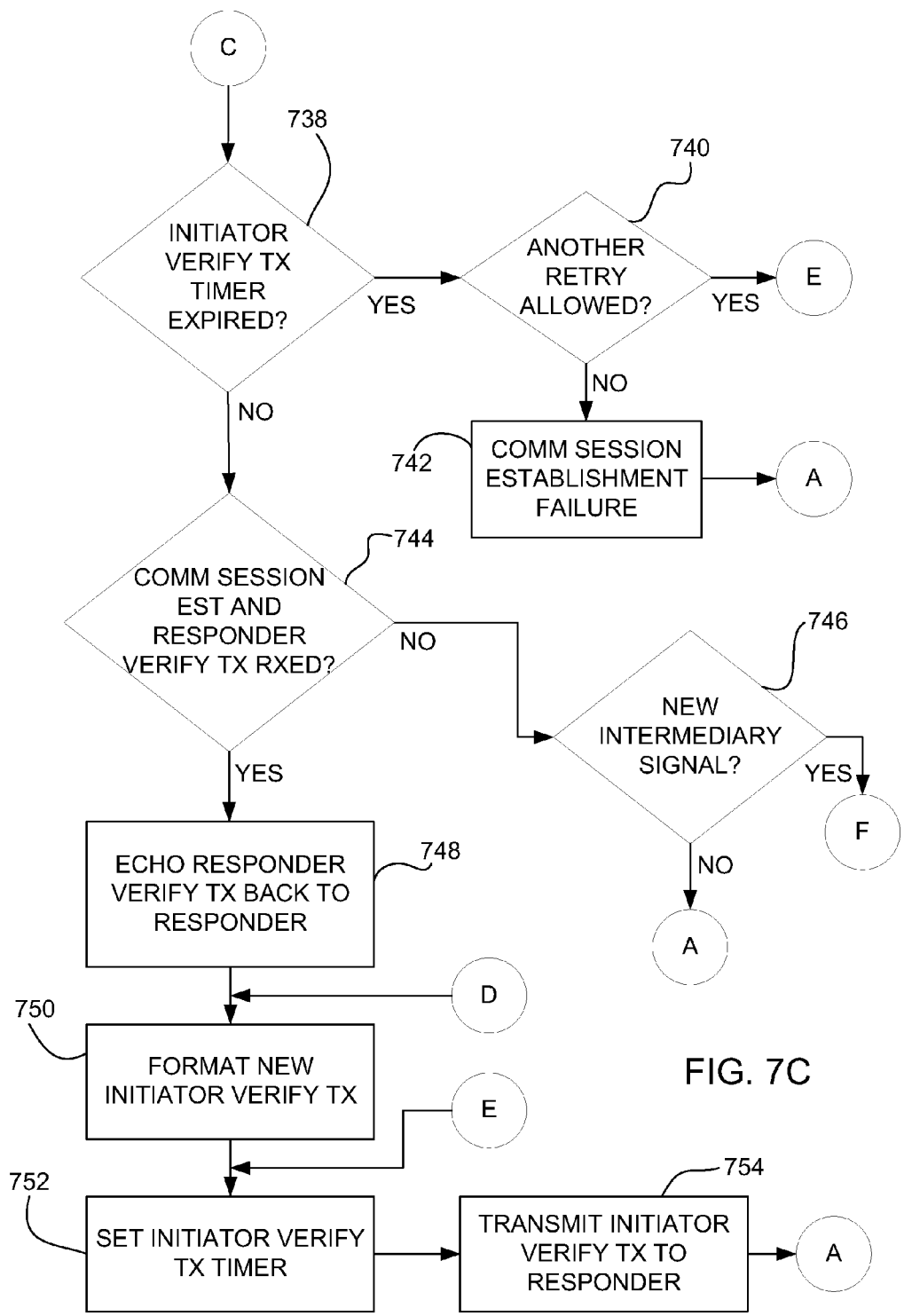

FIGS. 7A-7C illustrate an embodiment logic flow for an initiator endpoint peer to effect identification and authentication of endpoint peers to one or more intermediaries involved in a communication session. While the following discussion is made with respect to systems portrayed herein the operations described may be implemented in other systems. Further, the operations described herein are not limited to the order shown. Additionally, in other alternative embodiments more or fewer operations may be performed.

Referring to FIG. 7A, in an embodiment at decision block 700 a determination is made as to whether a communication session is established with the other endpoint, responder, peer and a data packet has been received from the other endpoint peer. If yes, in an embodiment the initiator processes the received data packet 702. At decision block 704 a determination is made as to whether the initiator has data traffic to transmit to the responder. If yes, the initiator transmits the next data packet to be sent to the responder 706. In an embodiment, whether or not the initiator has a data packet to transmit the logic returns to decision block 700 where again a determination is made as to whether a communication session is established with the other endpoint peer and a data packet has been received.

If at decision block 700 there is no current communication session established with the other endpoint, responder, peer and/or a data packet has not currently been received then in an embodiment at decision block 708 a determination is made as to whether a communication session is established with the other endpoint, responder, peer and there is a data packet to transmit. If yes, the initiator transmits the next data packet to be sent to the responder 712. In an embodiment the logic returns to decision block 700.

If at decision block 708 there is no current communication session established with the other endpoint, responder, peer and/or there is no current data packet to transmit then in an embodiment at decision block 712 a determination is made as to whether a new communication session is to be established with another endpoint peer. If yes, in an embodiment the initiator formats a handshake message that includes the initiator cookie 714 and transmits the formatted handshake message to the responder endpoint peer 716. An embodiment exemplary handshake message 230 formatted and transmitted by an initiator, e.g., client 100, is depicted in FIG. 3A.

In another embodiment the initiator formats a handshake message that includes data sufficient to designate related traffic between the same endpoints and which can be used to distinguish the initiator 714. In this other embodiment the initiator transmits the formatted handshake message to the responder endpoint peer 716.

If at decision block 712 there is no new communication session to be established with another endpoint peer then in an embodiment, and referring to FIG. 7B, at decision block 718 a determination is made as to whether a handshake message sent from the responder has been received. If yes, in an embodiment the received handshake message from the responder contains an initiator cookie, a responder cookie and intermediary stamps for each of the intermediaries in between the initiator and the responder. An embodiment exemplary handshake message 260 received by an initiator, e.g., client 100, is depicted in FIG. 3D.

In another embodiment the received handshake message transmitted from the responder contains data sufficient to distinguish the initiator, data sufficient to distinguish the responder, and intermediary stamps for each of the intermediaries in between the initiator and the responder.

In an embodiment the initiator collects, or otherwise gathers, all the intermediary stamps in the received handshake message 720. In an embodiment the collected intermediary stamps are input to a hash algorithm used for initiator endpoint authentication.

In an embodiment the initiator echoes the handshake message back to the responder 721.

Referring to FIG. 7C, in an embodiment the initiator formats a new initiator verify tx 750. An embodiment exemplary initiator verify tx 500 is depicted in FIG. 6A. In an embodiment the initiator sets an initiator verify tx timer 752. In an embodiment the initiator uses the initiator verify tx timer to ascertain if it receives an echoed initiator verify tx back from the responder within a predefined time limit. In an embodiment the initiator transmits the formatted initiator verify tx to the responder 754.

Referring again to FIG. 7B, at decision block 718 if no handshake message from the responder has been received then in an embodiment at decision block 722 a determination is made as to whether an echoed initiator verify tx has been received. If yes, in an embodiment the initiator disables the verify tx timer 724 as the echoed initiator verify tx has been received prior to the verify tx timer expiring. In an embodiment at decision block 726 a determination is made as to whether a rekeying event is occurring, i.e., whether or not the initiator and responder are establishing new cryptographic keys for the data transmissions for their current communication session. If a rekeying event is occurring, in an embodiment the initiator establishes a new SA for the current communication session 728. As previously noted, in an embodiment an SA, security association, is a logical group of security parameters used for providing a secure data connection between two endpoint peers.

In an embodiment, if no rekeying event is currently in progress the initiator, upon receiving the echoed initiator verify tx, will wait for a responder verify tx.

If at decision block 722 no echoed initiator verify tx has been received then in an embodiment at decision block 730 a determination is made as to whether an initial, first, responder verify tx has been received from the responder endpoint peer. An embodiment exemplary responder verify tx 530 is depicted in FIG. 6B.

If an initial responder verify tx has been received then in an embodiment the initiator establishes an SA for the communication session between itself and the responder endpoint peer 732. In an embodiment the initiator uses information and parameters from the responder verify tx in establishing the current SA for the extant communication session with the responder 732.

In an embodiment the initiator, after receiving an initial responder verify tx for the communication session, echoes the responder verify tx back to the responder 734. In an embodiment, thereafter the initiator uses the SA to transmit a data packet to the responder 736.

If at decision block 730 no initial responder verify tx for the current communication session between the initiator and responder has been received then, referring to FIG. 7C, in an embodiment at decision block 738 a determination is made as to whether the initiator verify tx timer has expired. If yes, in an embodiment at decision block 740 a determination is made as to whether a retry for transmitting the initiator verify tx is allowed. If yes, in an embodiment the initiator again sets the initiator verify tx timer 752 and transmits the initiator verify tx to the responder 754.

If at decision block 740 there is no retry allowed for transmitting the initiator verify tx then in an embodiment the establishment of the communication session with the responder has failed 742.

At decision block 738 if the initiator verify tx timer has not expired then in an embodiment at decision block 744 a determination is made as to whether a communication session with the responder is established and the initiator has received a responder verify tx. In an embodiment if there is an established communication session between the initiator and responder and the initiator receives a responder verify tx then a rekey event is being initiated, i.e., the initiator and responder are to establish new cryptographic keys for the data transmissions for their current communication session. If there is an established communication session between the initiator and responder and the initiator receives a responder verify tx then in an embodiment the initiator echoes the responder verify tx back to the responder 748. In an embodiment the initiator formats a new initiator verify tx 750, sets an initiator verify tx timer 752, and transmits the initiator verify tx to the responder 754.

If at decision block 744 no communication session between the initiator and another endpoint peer is established and/or the initiator has not received a responder verify tx then in an embodiment at decision block 746 a determination is made as to whether or not a new intermediary is signaling its presence in the communication path between the initiator and responder. In an embodiment a new intermediary to an existing communication session requests the endpoint peers rerun the identity and authentication protocols previously used to identify and authenticate the endpoint peers to the intermediaries, i.e., that a new identity and authentication event be initiated. In an embodiment a new intermediary sets a flag in any data packet between the endpoint peers indicating that the intermediary is newly involved and requests an identity and authentication event. In an alternative embodiment a new intermediary appends a new packet to a data packet between the endpoint peers that signals that the new intermediary requests an identity and authentication event. In yet another alternative embodiment a new intermediary generates a stand-alone rerun transmission that it sends to the endpoint peer in the communication direction the intermediary is included in to request an identity and authentication event. In still other alternative embodiments other formats can be utilized to signal at least one endpoint peer that an intermediary requests an identity and authentication event.

If at decision block 746 it is determined that a new intermediary is signaling its presence in a communication direction between the initiator and responder then referring to FIG. 7A, in an embodiment the initiator formats a handshake message that includes the initiator cookie 714, or, alternatively, data that designates the initiator, and transmits the handshake message to the responder 716.

Figure 8A:
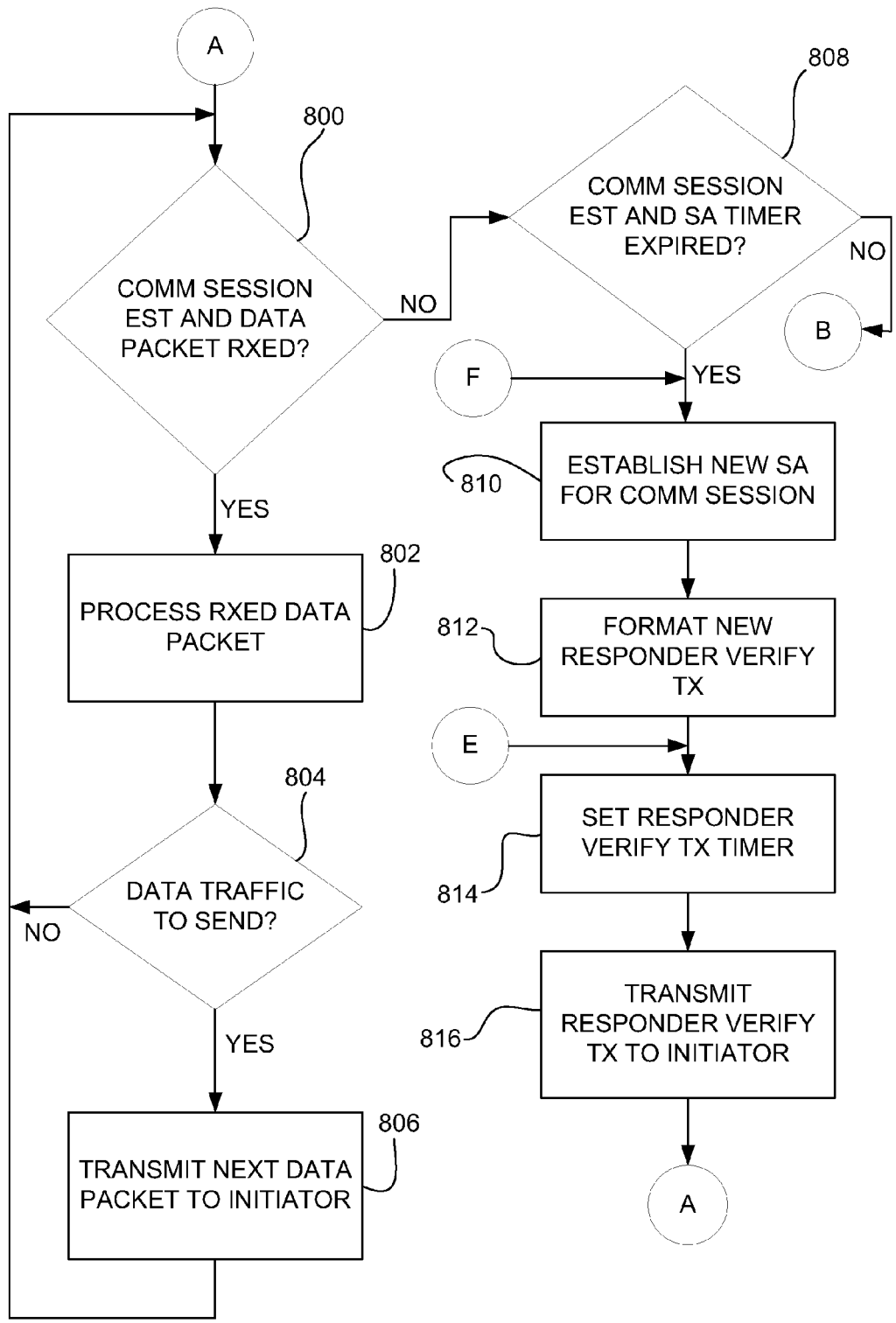
FIGS. 8A-8C illustrate an embodiment logic flow for a responder endpoint peer to identify and authenticate itself to one or more intermediaries in a communication session.
Figure 8B:
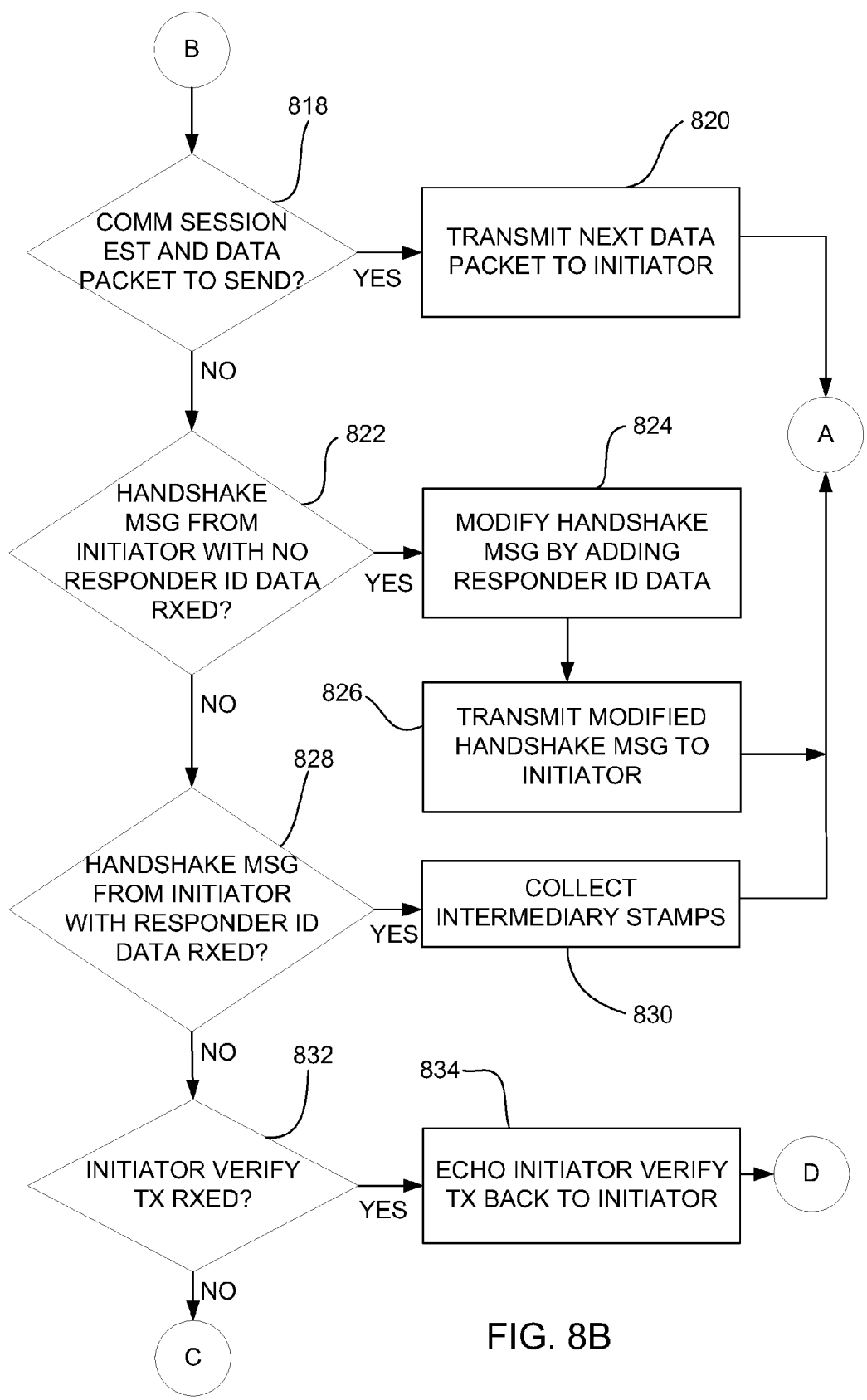
Figure 8C:
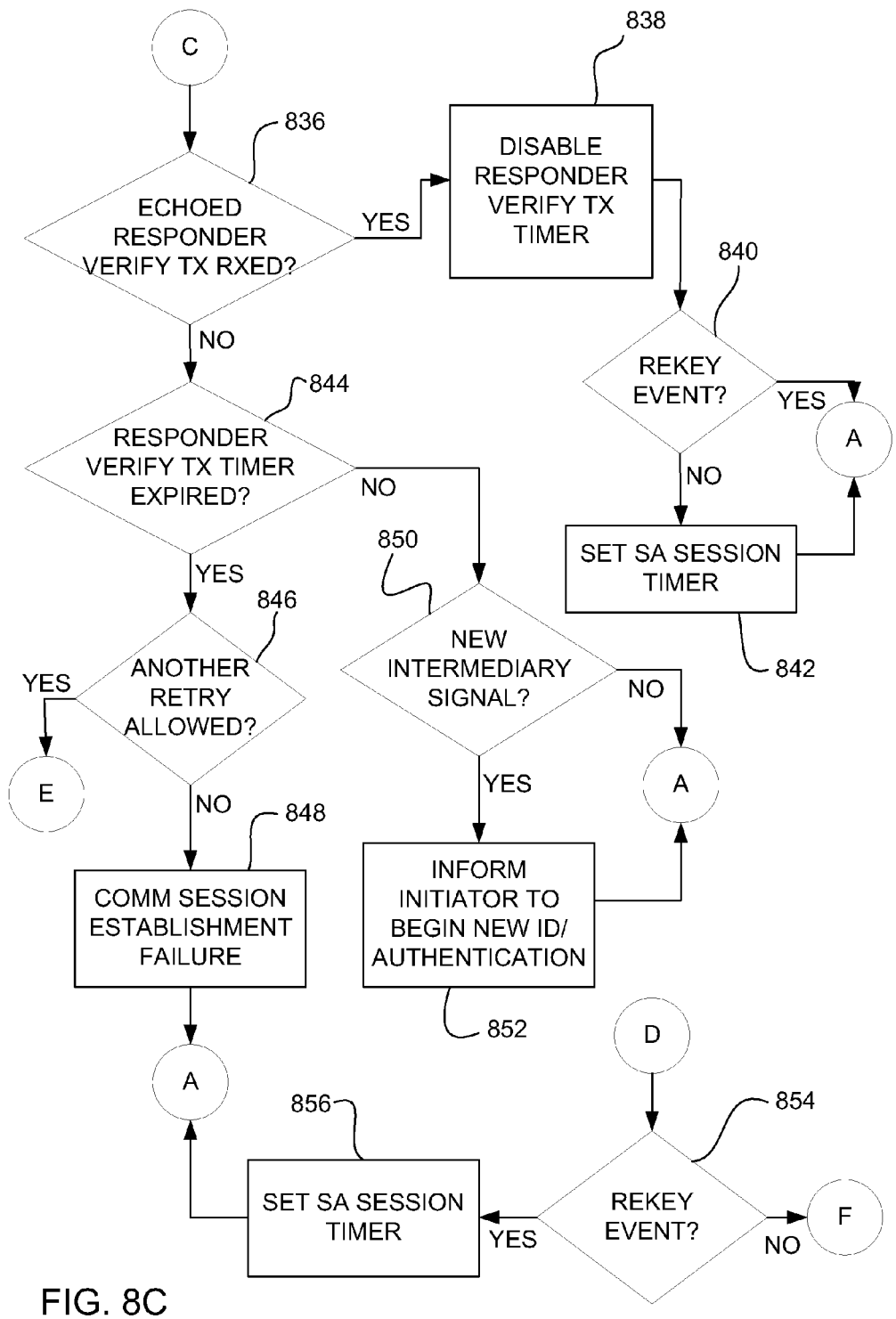

FIGS. 8A-8C illustrate an embodiment logic flow for a responder endpoint peer to effect identification and authentication of endpoint peers to one or more intermediaries involved in a communication session. While the following discussion is made with respect to systems portrayed herein the operations described may be implemented in other systems. Further, the operations described herein are not limited to the order shown. Additionally, in other alternative embodiments more or fewer operations may be performed.

Referring to FIG. 8A, in an embodiment at decision block 800 a determination is made as to whether a communication session is established with the other endpoint, initiator, peer and a data packet has been received from the other endpoint peer. If yes, in an embodiment the responder processes the received data packet 802. At decision block 804 a determination is made as to whether the responder has a data packet to transmit. If yes, the responder transmits the next data packet to be sent to the initiator 806. In an embodiment, whether or not the responder has a data packet to transmit the logic returns to decision block 800 where again a determination is made as to whether a communication session is established with the other endpoint peer and a data packet has been received.

If at decision block 800 there is no current communication session established with the other endpoint peer and/or a data packet has not currently been received then in an embodiment at decision block 808 a determination is made as to whether a communication session is established with the other endpoint, initiator, peer and an SA timer has expired. In an embodiment the responder uses an SA timer to determine when to initiate a new rekey event to establish new cryptographic keys for the data transmissions for the current initiator/responder communication session.

If a communication session is established with the initiator and the SA timer has expired in an embodiment the responder establishes a new SA for the current initiator/responder communication session 810. In an embodiment the responder formats a new responder verify tx 812. An embodiment exemplary responder verify tx 530 is depicted in FIG. 6B. In an embodiment the responder sets a responder verify tx timer 814. In an embodiment the responder uses the responder verify tx timer to ascertain if it receives an echoed responder verify tx back from the initiator within a predefined time limit. In an embodiment the responder transmits the responder verify tx to the initiator 816.

If at decision block 808 there is no communication session currently established for the initiator and responder and/or the SA timer has not expired then in an embodiment, and referring to FIG. 8B, at decision block 818 a determination is made as to whether a communication session is established with the other endpoint, initiator, peer and the responder has a data packet to transmit. If yes, in an embodiment the responder transmits the next data packet to be sent to the initiator 820. In an embodiment the logic returns to decision block 800.

If at decision block 818 there is no extant communication session established with the other endpoint peer and/or there is currently no data packet to transmit then in an embodiment at decision block 822 a determination is made as to whether a handshake message from the initiator without a responder cookie, or, alternatively, responder distinguishing data, has been received. If yes, in an embodiment the responder modifies the received handshake message by adding a responder cookie, or, alternatively, data that can be used to distinguish the responder, 824. An embodiment exemplary responder modified handshake message 250 is depicted in FIG. 3C.

In an alternative embodiment the responder formats a new handshake message that includes the initiator cookie from the received handshake message, a responder cookie, and any intermediary stamps contained within the received handshake message. In another alternative embodiment the responder formats a new handshake message that includes data that can be used to distinguish the initiator that was contained in the received handshake message, data that can be used to distinguish the responder, and any intermediary stamps contained within the received handshake message.

In an embodiment the responder transmits the handshake message containing the initiator cookie and a responder cookie, or, alternatively, data that distinguishes the initiator and responder, to the initiator 826. In an embodiment the logic returns to decision block 800.

If at decision block 822 no handshake message with a responder cookie, or, alternatively, data that distinguishes the responder, has been received then in an embodiment at decision block 828 a determination is made as to whether a handshake message from the initiator that includes a responder cookie, or, alternatively, data that distinguishes the responder, has been received. An embodiment exemplary handshake message 260 that includes a responder cookie 335 and is transmitted from the initiator 100 is depicted in FIG. 3D.

If at decision block 828 a handshake message with a responder cookie, or, alternatively, data that distinguishes the responder, is received then in an embodiment all the intermediaries in the initiator-to-responder and responder-to-initiator communication directions now have received a message containing data that can be used to distinguish the initiator and the responder. In an embodiment the handshake message with a responder cookie, or, alternatively, data that distinguishes the responder, also contains intermediary stamps for all the intermediaries between the initiator and responder. In an embodiment the responder collects, or otherwise gathers, all the intermediary stamps in the received handshake message 830. In an embodiment the collected intermediary stamps are input to a hash algorithm used for responder endpoint authentication If at decision block 828 no handshake message with a responder cookie, or data that distinguishes the responder, has been received then in an embodiment at decision block 832 a determination is made as to whether an initiator verify tx has been received. An embodiment exemplary initiator verify tx 500 is depicted in FIG. 6A. If an initiator verify tx has been received then in an embodiment the responder echoes the initiator verify tx back to the initiator 834. Referring to FIG. 8C, in an embodiment at decision block 854 a determination is made as to whether a rekey event is occurring. If yes, in an embodiment the responder sets an SA session timer for the new SA session 856 for the current initiator/responder communication session.

If at decision block 854 there is no rekey event then in an embodiment, and referring to FIG. 8A, the responder establishes a new SA for the initiator/responder communication session 810. In an embodiment the responder formats a new responder verify tx 812, sets a responder verify tx timer 814 and transmits the responder verify tx to the initiator 816.

Referring again to FIG. 8B, if at decision block 832 no initiator verify tx has been received then in an embodiment, and referring to FIG. 8C, at decision block 836 a determination is made as to whether the responder verify tx echoed back from the initiator has been received. If yes, in an embodiment the responder disables the responder verify tx timer 838 as it has successfully received the echoed responder verify tx back from the initiator before the responder verify tx timer expired. At decision block 840 a determination is made as to whether a rekey event is occurring. If no, in an embodiment the responder establishes an SA session timer for the new SA session between the initiator and the responder 842.

If at decision block 840 a rekey event is occurring then in an embodiment, upon receiving the echoed responder verify tx back from the initiator, the responder now waits for an initiator verify tx. An embodiment exemplary initiator verify tx 500 is depicted in FIG. 6A.

If at decision block 836 no echoed responder verify tx has been received then in an embodiment at decision block 844 a determination is made as to whether the responder verify tx timer has expired. If yes, in an embodiment at decision block 846 a determination is made as to whether a retry for transmitting the responder verify tx is allowed. If yes, in an embodiment, and referring to FIG. 8A, the responder again sets the responder verify tx timer 814 and transmits the responder verify tx to the initiator 816.

If at decision block 846 there is no retry allowed for transmitting the responder verify tx then in an embodiment the establishment of the communication session with the initiator has failed 848.

If at decision block 844 the responder verify tx timer has not expired, then in an embodiment at decision block 850 a determination is made as to whether or not a new intermediary is signaling its presence in the communication path between the initiator and responder. In an embodiment a new intermediary to an existing communication session requests the endpoint peers rerun the identity and authentication protocols previously used to identify and authenticate the endpoint peers to the intermediaries, i.e., that a new identity and authentication event be initiated.

If at decision block 850 a new intermediary is signaling its presence in the communication path between the initiator and responder then in an embodiment the responder informs the initiator to initiate a new identity and authentication event between the endpoint peers for the current communication session 852. In an aspect of this embodiment the responder passes the intermediary signal indicating the intermediary's presence through to the initiator in, or with, the next data packet transmitted from the responder to the initiator.

In an alternative embodiment the responder, upon receiving an intermediary signal that a new intermediary is joining in on the communication session path, becomes the initiator and begins a new identity and authentication event with the original initiator, who now will act as a responder.

FIGS. 9A-9D illustrate an embodiment logic flow for an intermediary in a communication path between two endpoint peers, i.e., an initiator and a responder, to effect identification and authentication of the endpoint peers for, e.g., implementing identity based rules on data packets transmitted between the endpoint peers. While the following discussion is made with respect to systems portrayed herein the operations described may be implemented in other systems. Further, the operations described herein are not limited to the order shown. Additionally, in other alternative embodiments more or fewer operations may be performed.

Figure 9A:
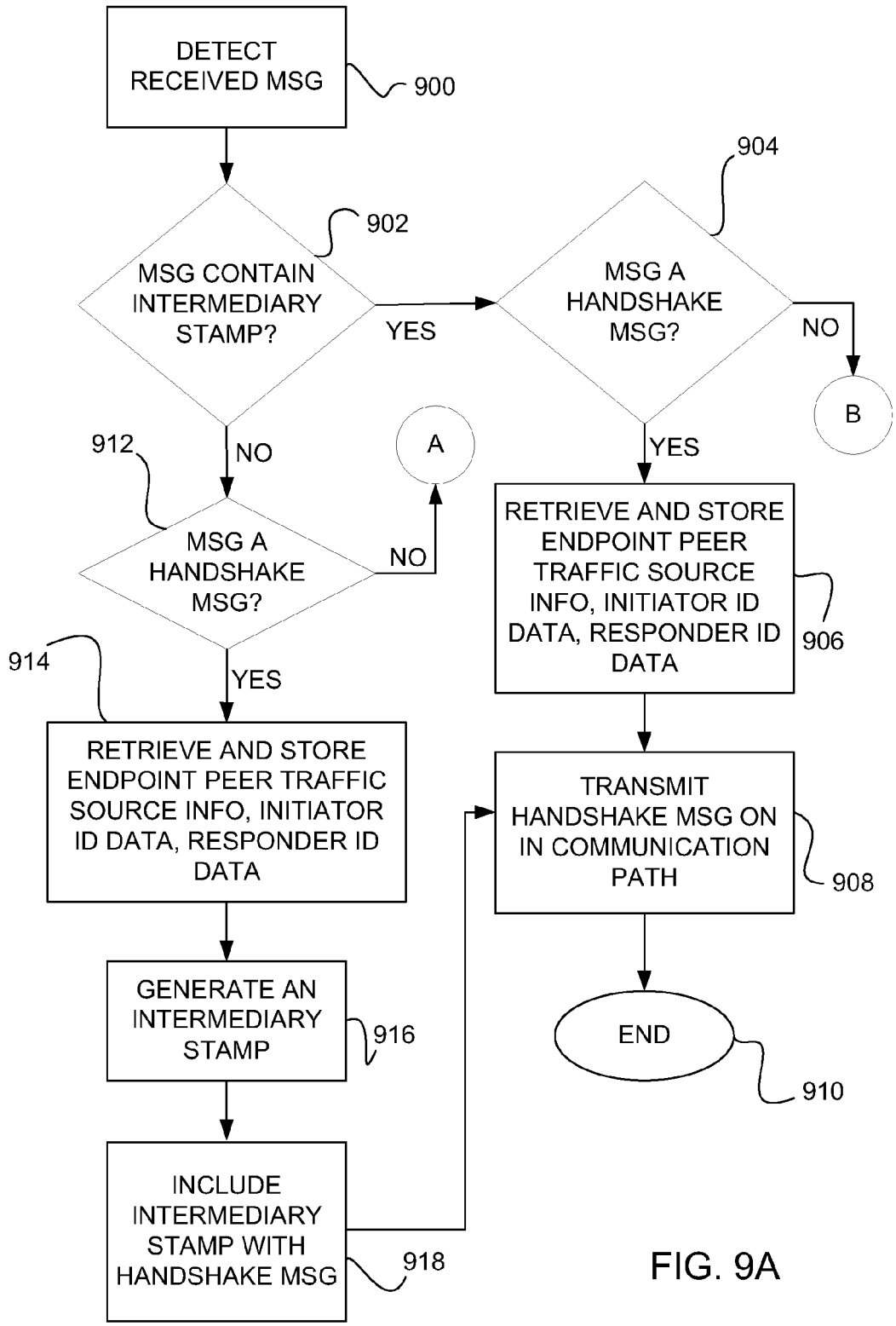
FIGS. 9A-9D illustrate an embodiment logic flow for an intermediary to identify and authenticate the endpoint peers in a communication session.

Referring to FIG. 9A, in an embodiment an intermediary in a communication path between two endpoint peers, e.g., a client and a server, receives a message originating from one of the endpoint peers 900. In an embodiment at decision block 902 a determination is made as to whether the received message contains an intermediary stamp for the intermediary. If yes, at decision block 904 a determination is made as to whether the received message is a handshake message. Embodiment exemplary handshake messages that an intermediary, e.g., I1 115 of FIG. 1A, may receive include exemplary handshake message 230 of FIG. 3A and exemplary handshake message 260 of FIG. 3D.

If at decision block 904 it is determined that the received message is a handshake message between the endpoint peers then in an embodiment the intermediary retrieves from the handshake message and stores the IP addresses for the endpoint peers 906. In an embodiment the intermediary retrieves from the handshake message and stores the initiator cookie, and if contained within the handshake message, the responder cookie 906. In an alternative embodiment the intermediary retrieves from the handshake message and stores data that distinguishes the initiator, and if contained within the handshake message, data that distinguishes the responder, and data that identifies the handshake message traffic as being between the initiator and the responder 906.

In an embodiment the initiator forwards the received message on in the communication path 908. In an embodiment processing of the currently received, handshake, message is then ended 910.

If at decision block 902 the received message does not contain an intermediary stamp then in an embodiment at decision block 912 a determination is made as to whether the received message is a handshake message. If yes, in an embodiment the intermediary retrieves from the handshake message and stores the IP addresses for the endpoint peers, the initiator cookie, and if contained within the current handshake message, the responder cookie 914.

In an alternative embodiment the intermediary retrieves from the handshake message and stores data that distinguishes the initiator, and if contained within the current handshake message, data that distinguishes the responder, and data that identifies the handshake message traffic as being between the initiator and the responder 914.

In an embodiment the intermediary generates an intermediary stamp to be added to the handshake message 916. An embodiment exemplary intermediary stamp 400 is depicted in FIG. 4. In an embodiment the intermediary includes its intermediary stamp with the received handshake message 918 and transmits the now modified handshake message on in the communication path 908. In an embodiment processing of the currently received, handshake, message is then ended 910.

Figure 9B:
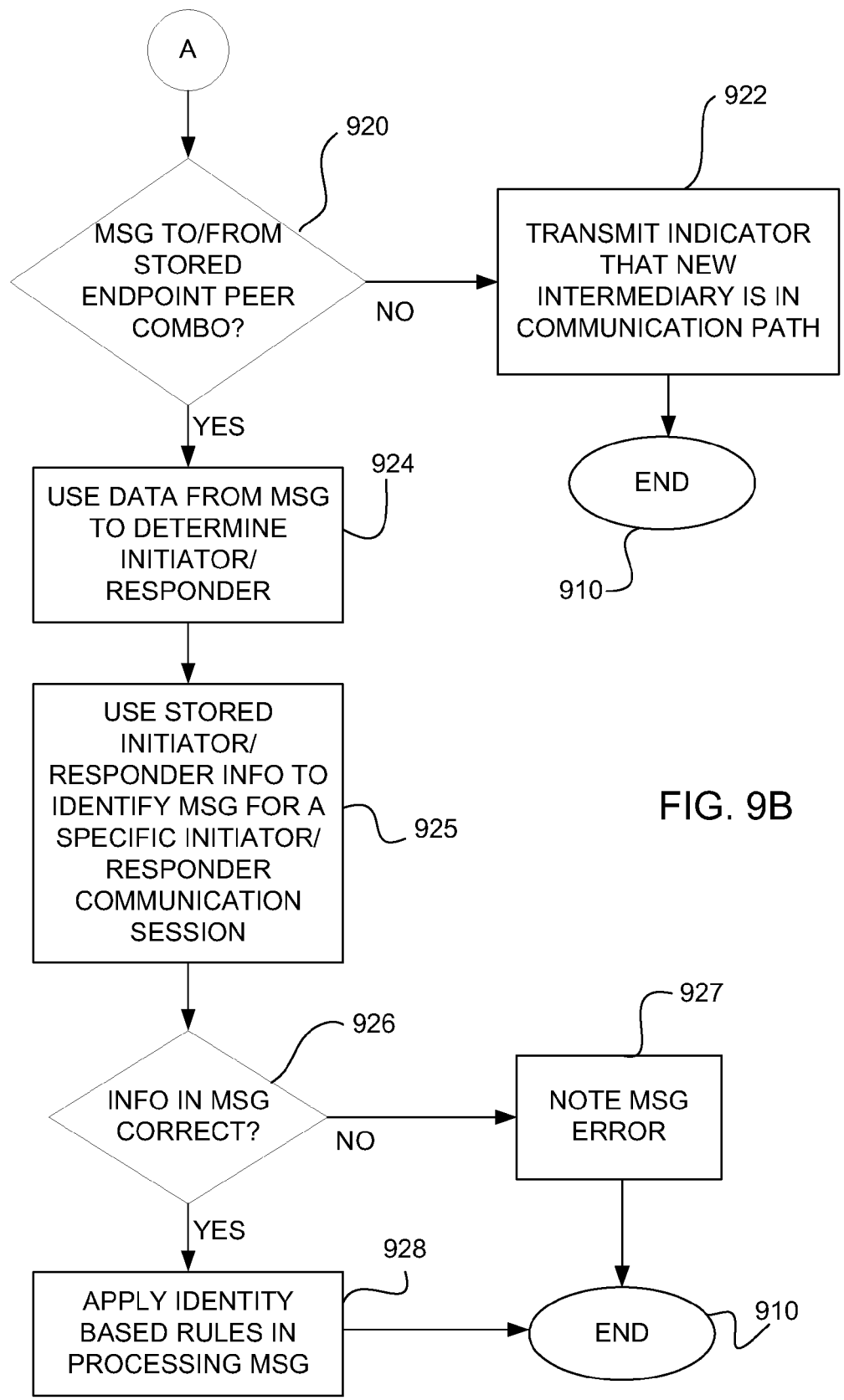

If at decision block 912 it is determined that the received message is not a handshake message then in an embodiment, and referring to FIG. 9B, at decision block 920 a determination is made as to whether the received message is to/from a currently stored endpoint peer combination, e.g., a currently stored IP address combination. In this embodiment at decision block 920 a determination is made as to whether the intermediary is cognizant of the identities of the endpoint peers that the currently received message is to/from. If yes, in an embodiment the intermediary uses the IP addresses in the received message and/or data in the received message that designates the message as being between the initiator and responder, to determine the initiator and responder for the received message 924. In an embodiment the intermediary uses stored initiator/responder information gleaned during an identity and authentication event for the initiator and responder for the current communication session to identify the specific communication session that the received message is part of 925.

In an embodiment at decision block 926 the intermediary makes a determination as to whether or not information in the received message is valid for the endpoint peers for the specific communication session that the received message appears to be part of, e.g., whether or not a substitution attack appears to be occurring. In this manner, in an embodiment at decision block 925 the intermediary verifies the integrity of a data packet purportedly being transmitted between the two endpoint peers of an established communication session. If at decision block 926 information, e.g., one or both addresses and/or one or both SPIs, of the data packet has been tampered with, or is otherwise deemed invalid, then in an embodiment the intermediary notes the error 927 and processing of the current received, data packet, message is ended 910.

In an embodiment an intermediary can determine a data packet containing altered information has been sent by an attacker and not a legitimate endpoint peer. Verifying data packet integrity in combination with the ability to identify and authenticate endpoint peers allows the intermediary to provide a more enhanced secure, robust data traffic path and processing.

In another embodiment an intermediary can detect that a data packet contains altered information, and thus, can be assumed to have been sent by an attacker, by using information it previously obtained from the handshake and/or authentication messages to access the relevant encryption keys for the communication session in order to look within the data packet to verify its integrity.

In an embodiment the intermediary can note a data packet error by sending an independent message to the endpoint peer in its communication direction path that indicates a received message information error.

If at decision block 926 there are no discovered errors, or perceived invalid information, in the received data packet then in an embodiment the intermediary, in processing the received data packet for further transmission in the communication path, applies any established identity based rules to the data packet based on the initiator and/or responder identity 928. In an embodiment the data packet is transmitted on in the communication path for the communication session pursuant to the identity based rules applied thereto 928. In an embodiment processing of the currently received data packet is ended 910.

If at decision block 920 the received message is not to/from an endpoint peer combination currently stored by the intermediary then, in an embodiment the intermediary can assume that it has newly joined an existing communication session between two endpoint peers. In an embodiment the intermediary signals one or both endpoint peers that it has newly joined the communication path and that it requests an identity and authentication event be initiated in order for the intermediary to identify and authenticate one or both endpoint peers 922.

In an embodiment an intermediary sets a flag in a data packet being transmitted between the endpoint peers indicating that the intermediary is newly involved in the communication path for the endpoint peers and it requests an identity and authentication event 922. In an alternative embodiment an intermediary appends a new packet to a data packet being transmitted between the endpoint peers to signal that the intermediary requests an identity and authentication event 922.

In a second alternative embodiment an intermediary generates a stand-alone rerun transmission that it sends to the endpoint peer in the communication direction the intermediary is included in to request an identity and authentication event 922. In this second alternative embodiment the intermediary also forwards the original received data packet along in the proper communication direction 922. In still other alternative embodiments other formats can be utilized to signal at least one endpoint peer that the intermediary requests an identity and authentication event.

In an embodiment processing of the currently received data packet is then ended 910.

Figure 9C:
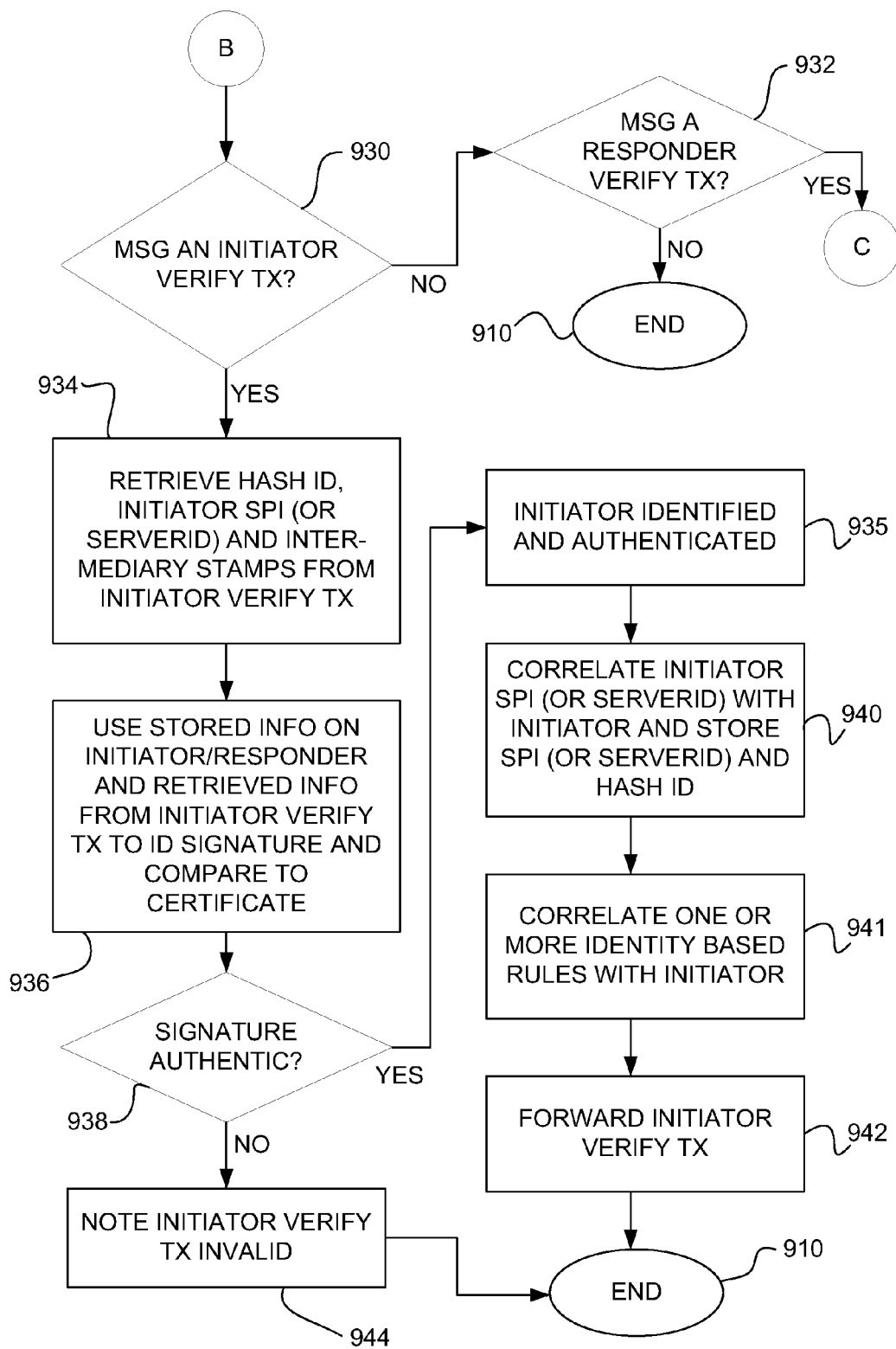
Figure 9D:
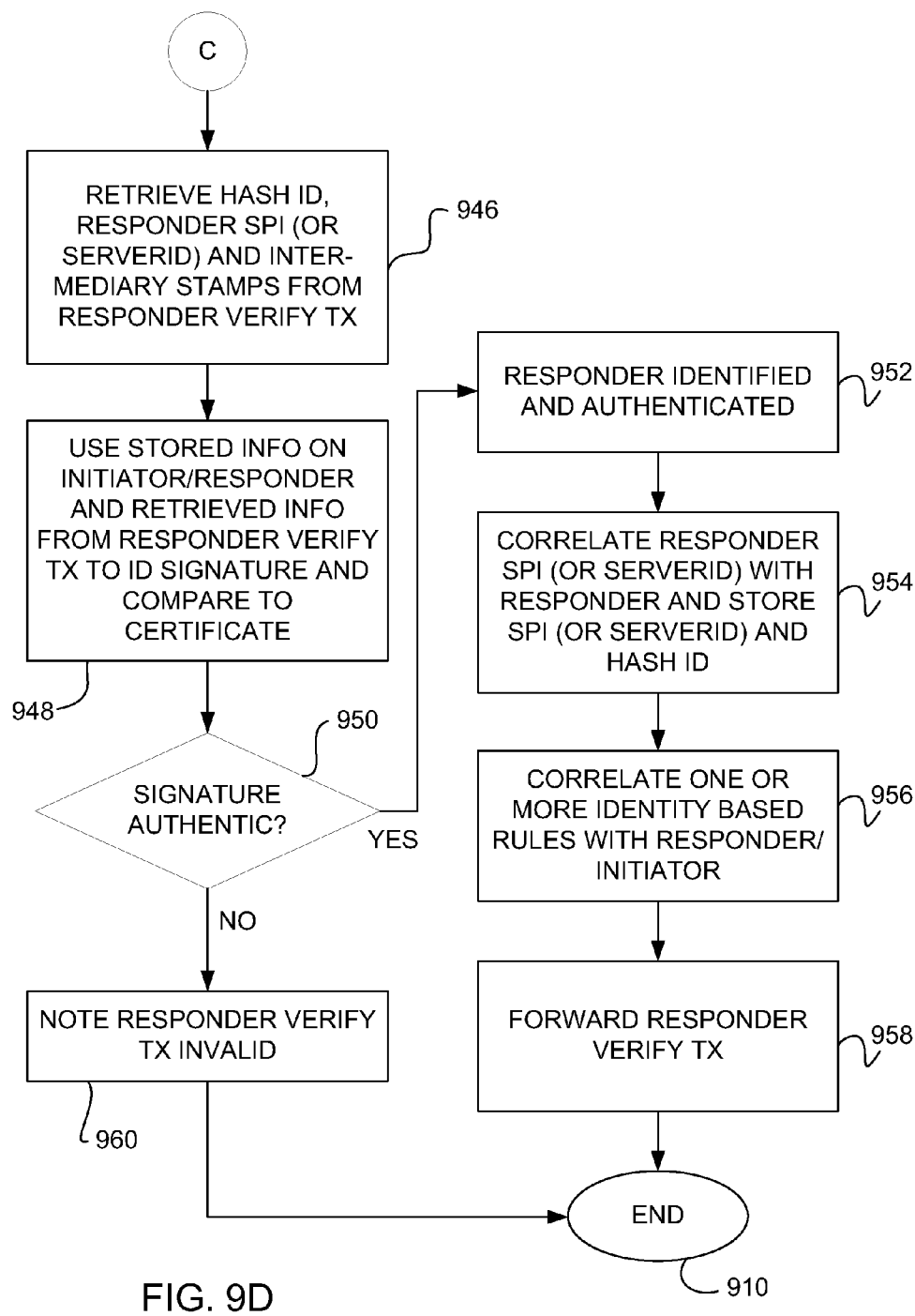

Referring back to FIG. 9A, if at decision block 904 the currently received message is not a handshake message but it does contain an intermediary stamp for the intermediary then in an embodiment, and referring to FIG. 9C, at decision block 930 a determination is made as to whether the received message is an initiator verify tx. An embodiment exemplary initiator verify tx 500 is depicted in FIG. 6A.

If the newly received message is an initiator verify tx then in an embodiment the intermediary retrieves the hash id and initiator SPI, or serverid, and intermediary stamps from the initiator verify tx 934. In an embodiment the intermediary uses stored information for the initiator and responder for the current communication session being established and retrieved information from the initiator verify tx to decipher the initiator signature and determine whether the initiator signature correctly correlates with the initiator certificate, or initiator certificate information, 936. In an embodiment the initiator signature in the initiator verify tx is a signed signature value. In an embodiment the signed signature value is the result of a hash algorithm on the initiator cookie, the responder cookie and the intermediary stamps. In an embodiment the initiator verify tx contains the hash id and the initiator SPI, or serverid, in an ineginfo packet. In an embodiment the intermediary has the information it requires to decipher the initiator signature and attempt to correlate it with the initiator certificate, or initiator certificate information.

In an embodiment at decision block 938 the intermediary determines whether the signature is authentic, i.e., whether the deciphered initiator signature correctly correlates with the certificate included in the initiator verify tx, a stored initiator certificate or stored initiator certificate information. If yes, the intermediary has identified the initiator with the initiator certificate information, or information in the initiator certificate, and has also authenticated the initiator 935. In an embodiment the intermediary correlates the initiator SPI, or serverid, with the initiator and stores the initiator SPI, or serverid, and the hash id from the initiator verify tx for future use in certifying data packets and applying identity based rules to data packets transmitted for the current communication session 940.

In an embodiment the intermediary correlates one or more identity based rules with the identified initiator for use in processing data packets transmitted between the initiator and a responder endpoint peer 941. In an embodiment the intermediary forwards the initiator verify tx on in the communication path between the initiator and the responder 942. In an embodiment processing of the currently received, initiator verify tx, message is ended 910.

If at decision block 938 the intermediary has determined the initiator signature is invalid, or unauthentic, then in an embodiment the intermediary notes the error 944. In an embodiment processing of the currently received invalid initiator verify tx message is ended 910.

If at decision block 930 the received message is not an initiator verify tx then at decision block 932 a determination is made as to whether the received message is a responder verify tx. An embodiment exemplary responder verify tx 530 is depicted in FIG. 6B. If the newly received message is a responder verify tx then in an embodiment, and referring to FIG. 9D, the intermediary retrieves the hash id and responder serverid, or SPI, and intermediary stamps from the responder verify tx 946. In an embodiment the intermediary uses stored information for the initiator and responder for the current communication session being established and retrieved information from the responder verify tx to decipher the responder signature and determine whether the deciphered responder signature correctly correlates with the responder certificate, or responder certificate information, 948.

In an embodiment the responder signature in the responder verify tx is a signed signature value. In an embodiment the signed signature value is the result of a hash algorithm on the initiator cookie, the responder cookie and the intermediary stamps. In an embodiment the responder verify tx contains the hash id and the responder serverid, or SPI, in an rneginfo packet. In an embodiment the intermediary has the information it requires to decipher the responder signature and attempt to correlate it with the responder certificate, or responder certificate information.

In an embodiment at decision block 950 the intermediary determines whether the responder signature is authentic, i.e., whether the deciphered responder signature correctly correlates with the responder certificate included in the responder verify tx, a stored responder certificate or stored responder certificate information. If yes, the intermediary has identified the responder with the responder certificate information, or information in the responder certificate, and has also authenticated the responder 952. In an embodiment the intermediary correlates the responder serverid, or SPI, with the responder and stores the responder serverid, or SPI, and the hash id from the responder verify tx for future use in certifying received data packets and applying identity based rules to data packets transmitted for the current communication session 954.

In an embodiment the intermediary correlates one or more identity based rules with the identified responder for use in processing data packets transmitted between the responder and initiator 956. In an embodiment the intermediary can also, or alternatively, correlate one or more identity based rules with the identified responder and a prior identified initiator for use in processing data packets transmitted between the responder and initiator 956.

In an embodiment the intermediary forwards the responder verify tx on in the communication path between the responder and the initiator 958. In an embodiment processing of the currently received, responder verify tx, message is ended 910.

If at decision block 950 the intermediary has determined the responder signature is invalid, or unauthentic, then in an embodiment the intermediary notes the error 960. In an embodiment processing of the invalid responder verify tx message is ended 910.

Referring again to FIG. 9C, if at decision block 932 the received message is not a responder verify tx then in an embodiment the intermediary cannot identify the received message. In an embodiment processing of the unknown message is ended 910.

Computing Device System Configuration

Figure 10:
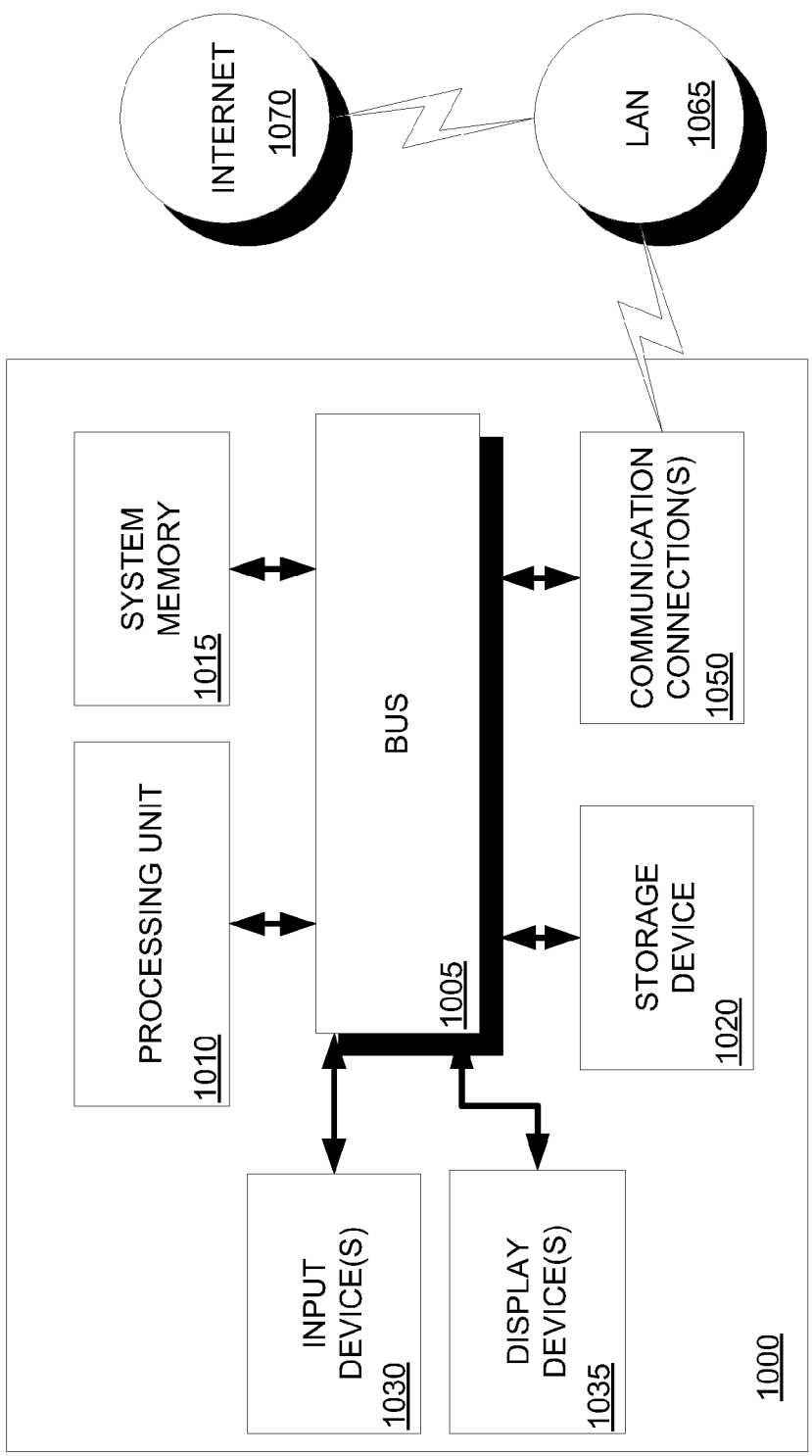
FIG. 10 is a block diagram of an exemplary basic computing device system that can process software, i.e., program code, or instructions.

FIG. 10 is a block diagram that illustrates an exemplary computing device system 1000 upon which an embodiment can be implemented. The computing device system 1000 includes a bus 1005 or other mechanism for communicating information, and a processing unit 1010 coupled with the bus 1005 for processing information. The computing device system 1000 also includes system memory 1015, which may be volatile or dynamic, such as random access memory (RAM), non-volatile or static, such as read-only memory (ROM) or flash memory, or some combination of the two. The system memory 1015 is coupled to the bus 1005 for storing information and instructions to be executed by the processing unit 1010, and may also be used for storing temporary variables or other intermediate information during the execution of instructions by the processing unit 1010. The system memory 1015 often contains an operating system and one or more programs, and may also include program data.

In an embodiment, a storage device 1020, such as a magnetic or optical disk, is also coupled to the bus 1005 for storing information, including program code comprising instructions and/or data.

The computing device system 1000 generally includes one or more display devices 1035, such as, but not limited to, a display screen, e.g., a cathode ray tube (CRT) or liquid crystal display (LCD), a printer, and one or more speakers, for providing information to a computing device user. The computing device system 1000 also generally includes one or more input devices 1030, such as, but not limited to, a keyboard, mouse, trackball, pen, voice input device(s), and touch input devices, which a computing device user can use to communicate information and command selections to the processing unit 1010. All of these devices are known in the art and need not be discussed at length here.

The processing unit 1010 executes one or more sequences of one or more program instructions contained in the system memory 1015. These instructions may be read into the system memory 1015 from another computing device-readable medium, including, but not limited to, the storage device 1020. In alternative embodiments, hard-wired circuitry may be used in place of or in combination with software program instructions. The computing device system environment is not limited to any specific combination of hardware circuitry and/or software.

The term "computing device-readable medium" as used herein refers to any medium that can participate in providing program instructions to the processing unit 1010 for execution. Such a medium may take many forms, including but not limited to, storage media and transmission media. Examples of storage media include, but are not limited to, RAM, ROM, EEPROM, flash memory, CD-ROM, digital versatile disks (DVD), magnetic cassettes, magnetic tape, magnetic disk storage, or any other magnetic medium, floppy disks, flexible disks, punch cards, paper tape, or any other physical medium with patterns of holes, memory chip, or cartridge. The system memory 1015 and storage device 1020 of the computing device system 1000 are further examples of storage media. Examples of transmission media include, but are not limited to, wired media such as coaxial cable(s), copper wire and optical fiber, and wireless media such as optic signals, acoustic signals, RF signals and infrared signals.

The computing device system 1000 also includes one or more communication connections 1050 coupled to the bus 1005. The communication connection(s) 1050 provide a two-way data communication coupling from the computing device system 1000 to other computing devices on a local area network (LAN) 1065 and/or wide area network (WAN), including the World Wide Web, or Internet 1070. Examples of the communication connection(s) 1050 include, but are not limited to, an integrated services digital network (ISDN) card, modem, LAN card, and any device capable of sending and receiving electrical, electromagnetic, optical, acoustic, RF or infrared signals.

Communications received by the computing device system 1000 can include program instructions and program data. The program instructions received by the computing device system 1000 may be executed by the processing unit 1010 as they are received, and/or stored in the storage device 1020 or other non-volatile storage for later execution.

CONCLUSION

While various embodiments are described herein, these embodiments have been presented by way of example only and are not intended to limit the scope of the claimed subject matter. Many variations are possible which remain within the scope of the following claims. Such variations are clear after inspection of the specification, drawings and claims herein. Accordingly, the breadth and scope of the claimed subject matter is not to be restricted except as defined with the following claims and their equivalents.

What is claimed is:

1. A method for enabling endpoint peer identification of at least one of two endpoint peers in a communication session, the method performed by an intermediary to forward communications exchanged between the two endpoint peers, the method comprising:
   generating an intermediary stamp, the intermediary timestamp comprising a nonce;
   adding the intermediary stamp to a first message originating from an endpoint peer to generate an amended first message wherein the first message originating from the endpoint peer is the first to be exchanged between the two endpoint peers when establishing a corresponding communication session between the two endpoint peers;
   transmitting the amended first message on a communication path for the communication session;
   receiving a message originating from the first of the two endpoint peers, the message comprising the intermediary stamp and a signature identification for the first of the two endpoint peers, the signature identification comprising a hash of data that includes the intermediary stamp, the signature identification having been computed by the first of the two endpoint peers;
   authenticating an identity of the first of the two endpoint peers using the signature identification for the first of the two endpoint peers and certificate information for the first of the two endpoint peers;
   identifying the first of the two endpoint peers using the certificate information for the first of the two endpoint peers;
   correlating one or more identity based rules with the identity of the first of the two endpoint peers;
   receiving a data message originating from the first of the two endpoint peers comprising data traffic;
   determining that the data message originating from the first of the two endpoint peers comprising data traffic is a data packet transmitted for the communication session between the two endpoint peers and that the data packet was transmitted by an identified endpoint peer; and
   applying at least one of the one or more identity based rules to the processing of the data packet.

2. The method for enabling endpoint peer identification of at least one of the two endpoint peers in a communication session of claim 1 wherein the first of the two endpoint peers is a client and the second of the two endpoint peers is a server.

3. The method for enabling endpoint peer identification of at least one of the two endpoint peers in a communication session of claim 1, further comprising:
   receiving a message transmitted from the second of the two endpoint peers comprising the intermediary stamp and a signature identification for the second of the two endpoint peers;
   authenticating the identity of the second of the two endpoint peers using the signature identification for the second of the two endpoint peers and certificate information for the second of the two endpoint peers;
   identifying the second of the two endpoint peers using the certificate information for the second of the two endpoint peers;

correlating one or more identity based rules with the identity of the first of the two endpoint peers and the identity of the second of the two endpoint peers;
receiving a second data message originating from an endpoint peer wherein the second data message comprises data traffic;
determining that the second data message originating from the endpoint peer comprising data traffic is a second data packet transmitted for the communication session between the two endpoint peers and that the second data packet was transmitted by an identified endpoint peer; and
applying at least one of the one or more identity based rules to the processing of the second data packet.

4. The method for enabling endpoint peer identification of at least one of the two endpoint peers in a communication session of claim 3 wherein the signature identification for the first of the two endpoint peers comprises a signed value generated from a hash algorithm whose input comprises the intermediary stamp and wherein the signature identification for the second of the two endpoint peers comprises a signed value generated from a hash algorithm whose input comprises the intermediary stamp.

5. The method for enabling endpoint peer identification of at least one of the two endpoint peers in a communication session of claim 4 wherein the input for each hash algorithm comprises an intermediary stamp for each intermediary in the communication path between the two endpoint peers in the communication session.

6. The method for enabling endpoint peer identification of at least one of the two endpoint peers in a communication session of claim 4 wherein the received message originating from the first of the two endpoint peers comprising the intermediary stamp and a signature identification for the first of the two endpoint peers further comprises an initiator SPI and wherein the input to the hash algorithm for generating the signature identification for the first of the two endpoint peers further comprises the initiator SPI.

7. The method for enabling endpoint peer identification of at least one of the two endpoint peers in a communication session of claim 1 wherein the received message originating from the first of the two endpoint peers comprising the intermediary stamp and a signature identification for the first of the two endpoint peers further comprises a certificate comprising the certificate information for the first of the two endpoint peers.

8. The method for enabling endpoint peer identification of at least one of the two endpoint peers in a communication session of claim 1, further comprising:
verifying the integrity of the data message originating from the first of the two endpoint peers comprising data traffic; and
transmitting the data message originating from the first of the two endpoint peers comprising data traffic on in the communication path between the two endpoint peers only if the integrity of the data message originating from the first of the two endpoint peers comprising data traffic is successfully verified.

9. The method for enabling endpoint peer identification of at least one of the two endpoint peers in a communication session of claim 1, further comprising:
receiving a message from one of the two endpoint peers while lacking the identification of either of the two endpoint peers; and
transmitting an indicator that a new intermediary is in the communication path for the communication session between the two endpoint peers.

10. A method for identifying at least one of two endpoint peers in a communication session that comprises a communication path with three or more entities wherein the three or more entities comprise two endpoint peers and one or more intermediaries, the method performed by an intermediary and comprising:
generating an intermediary stamp; the intermediary stamp comprising a nonce;
including the intermediary stamp in a first message originating from an endpoint peer for establishing the communication session between the two endpoint peers;
transmitting the first message with the intermediary stamp on to the next entity in the communication path for the communication session;
receiving a second message originating from a first of the two endpoint peers wherein the second message comprises the intermediary stamp generated by the intermediary and a signature identification of the first of the two endpoint peers, the signature identification comprising a hash of data that includes the intermediary stamp;
authenticating the identity of the first of the two endpoint peers using the signature identification for the first of the two endpoint peers and certificate information for the first of the two endpoint peers, the signature including a hash of the intermediary stamp;
identifying the first of the two endpoint peers with the certificate information for the first endpoint peer;
correlating one or more identity based rules with the identity of the first of the two endpoint peers;
receiving a data packet originating from the first of the two endpoint peers; and
applying at least one of the one or more identity based rules to the processing of the data packet for transmission on in the communication path for the communication session.

11. The method for identifying at least one of two endpoint peers in a communication session of claim 10, further comprising:
the intermediary correlating one or more identity based rules with the identity of the first of the two endpoint peers;
the intermediary receiving a data packet originating from the first of the two endpoint peers; and
the intermediary applying at least one of the one or more identity based rules to the processing of the data packet for transmission on in the communication path for the communication session.

12. The method for identifying at least one of the two endpoint peers in a communication session of claim 10 wherein the second message originating from the first of the two endpoint peers further comprises a certificate comprising the certificate information for the first of the two endpoint peers.

13. The method for identifying at least one of the two endpoint peers in a communication session of claim 10 wherein the signature identification for the first of the two endpoint peers comprises a value generated by a hash algorithm wherein the hash algorithm input comprises the intermediary stamp generated by the intermediary.

14. A computing device readable medium having computing device executable instructions stored thereon that when executed by a processor of a computing device implement a method for enabling identification of at least one of two endpoint peers in a communication session comprising a communication path comprising an intermediary, the computing device readable medium comprising:

computing device executable instructions for the intermediary in the communication path for the communication session to receive a first message originating from one of the two endpoint peers, the first message having an application-level identifier to be used by the other of the endpoint peer in establishing an application-level communication session;

computing device executable instructions for the intermediary in the communication path for the communication session to generate an intermediary stamp and add the intermediary stamp to the first message originating from the one of the two endpoint peers;

computing device executable instructions for the intermediary in the communication path for the communication session to transmit the first message with the added intermediary stamp on to the next entity in the communication path for the communication session;

computing device executable instructions for the intermediary in the communication path for the communication session to receive a second message originating from one of the two endpoint peers wherein the second message comprises the intermediary stamp for the intermediary, a signature identification for one of the two endpoint peers and a certificate for one of the two endpoint peers;

computing device executable instructions for the intermediary in the communication path for the communication session to authenticate the identity of one of the two endpoint peers using the signature identification for the one of the two endpoint peers and the certificate for the one of the two endpoint peers, the signature identification comprising a hash of both the application-level identifier and the intermediary stamp;

computing device executable instructions for the intermediary in the communication path for the communication session to identify one of the two endpoint peers using the certificate for the one of the two endpoint peers;

computing device executable instructions for the intermediary in the communication path for the communication session to receive a data packet originating from the one of the two endpoint peers; and computing device executable instructions for the intermediary in the communication path for the communication session to apply at least one identity based rule correlated with the identity of the one of the two endpoint peers to the processing of the data packet for transmission on in the communication path for the communication session.

15. The computing device readable medium of claim 14 wherein the computing device executable instructions for the intermediary in the communication path for the communication session to generate an intermediary stamp comprise computing device executable instructions for including a unique nonce value for the intermediary in the generated intermediary stamp.

16. The computing device readable medium of claim 14, further comprising:

computing device executable instructions for the intermediary in the communication path for the communication session to decipher the signature identification using information in the second message to generate a deciphered signature value; and computing device executable instructions for the intermediary in the communication path for the communication session to correlate the deciphered signature value with the certificate for the one of the two endpoint peers to authenticate the identity of the one of the two endpoint peers.

17. The computing device readable medium of claim 14 wherein the signature identification for the one of the two endpoint peers comprises a value generated by a hash algorithm wherein the hash algorithm input comprises the intermediary stamp.

18. The computing device readable medium of claim 14, further comprising: computing device executable instructions for the intermediary in the communication path for the communication session to correlate one or more identity based rules with the identity of the one of the two endpoint peers;

computing device executable instructions for the intermediary in the communication path for the communication session to receive a data packet originating from the one of the two endpoint peers; and computing device executable instructions for the intermediary in the communication path for the communication session to apply at least one identity based rule correlated with the identity of the one of the two endpoint peers to the processing of the data packet for transmission on in the communication path for the communication session.

* * * * *